US 11,815,108 B2

(12) United States Patent
Kasuga et al.

(10) Patent No.: US 11,815,108 B2
(45) Date of Patent: Nov. 14, 2023

(54) ELECTRO-HYDRAULIC ACTUATOR

(71) Applicant: ICAN COMPANY LTD., Tokyo (JP)

(72) Inventors: Toshishige Kasuga, Tokyo (JP); Yasuhiro Azuma, Tokyo (JP)

(73) Assignee: ICAN COMPANY LTD., Tokyo (JP)

(*) Notice: Subject to any disclaimer, the term of this patent is extended or adjusted under 35 U.S.C. 154(b) by 0 days.

(21) Appl. No.: 17/995,990

(22) PCT Filed: Nov. 12, 2021

(86) PCT No.: PCT/JP2021/041762
§ 371 (c)(1),
(2) Date: Oct. 12, 2022

(87) PCT Pub. No.: WO2022/137882
PCT Pub. Date: Jun. 30, 2022

(65) Prior Publication Data
US 2023/0124513 A1   Apr. 20, 2023

(30) Foreign Application Priority Data

Dec. 23, 2020   (JP) .................................. 2020-213583
Oct. 27, 2021   (JP) .................................. 2021-175803

(51) Int. Cl.
*F15B 15/18*    (2006.01)
*F16D 55/224*   (2006.01)
(Continued)

(52) U.S. Cl.
CPC ............ *F15B 15/18* (2013.01); *F16D 55/224* (2013.01); *F16D 65/18* (2013.01);
(Continued)

(58) Field of Classification Search
CPC .... F15B 15/18; F16D 55/224; F16D 2121/06; F16D 2127/02; F16D 2129/02
See application file for complete search history.

(56) References Cited

U.S. PATENT DOCUMENTS 3,815,361 A * 6/1974 Manini .................. E05F 15/53
                                                    60/403
5,595,103 A * 1/1997 Ecoff ...................... B23H 7/30
                                                    92/165 PR
(Continued)

FOREIGN PATENT DOCUMENTS

DE   102007023413 A1 * 11/2008  .............. F15B 15/18
EP       0006045 A1 * 12/1979  .............. F15B 15/18
(Continued)

OTHER PUBLICATIONS

Jtekt Corporation, "Development of Electric Oil Pump for Automotive Drivetrain", [online], [accessed Dec. 15, 2020], Internet <URL: http://eb-cat.ds-navi.co.jp/jpn/jtekt/tech/ej/img/no1003/1003_09.pdf>.

(Continued)

*Primary Examiner* — Kenneth Bomberg
*Assistant Examiner* — Matthew Wiblin
(74) *Attorney, Agent, or Firm* — Isshiki & Partners; Joseph P. Farrar, Esq.

(57) ABSTRACT

An electro-hydraulic actuator includes: a motor output rotative power; an external gear pump activated by the motor; a hydraulic actuator operated by a pressurized working fluid supplied by the external gear pump; a manifold block in which a flow channel forming a working fluid circuit of the hydraulic actuator is incorporated; a first portion to store the motor; a second portion to store the external gear pump, the hydraulic actuator, and a reservoir; and a coupling portion to couple the first portion and the second portion in a liquid-tight state. The coupling portion includes a communication hole through which the first portion and the second portion communicate, a rotational shaft of the motor and a driving shaft of the external gear pump are joined to each other, and (Continued)

the external gear pump is attached to the coupling portion while being stored in the manifold block.

8 Claims, 18 Drawing Sheets

(51) Int. Cl.
    *F16D 65/18*     (2006.01)
    *F16D 121/06*     (2012.01)
    *F16D 127/02*     (2012.01)
    *F16D 129/02*     (2012.01)

(52) U.S. Cl.
    CPC ...... *F16D 2121/06* (2013.01); *F16D 2127/02* (2013.01); *F16D 2129/02* (2013.01)

(56) References Cited

U.S. PATENT DOCUMENTS

| | | | |
|---|---|---|---|
| 6,112,861 A | | 9/2000 | Tomoe |
| 6,979,185 B2 * | | 12/2005 | Kaempe ................. F15B 15/18 418/206.4 |
| 10,077,816 B2 | | 9/2018 | Gentzsch |
| 10,228,031 B2 | | 3/2019 | Gentzsch |
| 2007/0266848 A1 * | | 11/2007 | Di Saverio ........... E05F 15/603 91/361 |

FOREIGN PATENT DOCUMENTS

| | | | | |
|---|---|---|---|---|
| EP | 1548289 A1 | 6/2005 | | |
| EP | 1826417 A2 * | 8/2007 | ............. | F15B 15/18 |
| FR | 2671144 A1 * | 7/1992 | ............. | F15B 15/18 |
| JP | H1137186 A | 2/1999 | | |
| JP | 2001310730 A | 11/2001 | | |
| JP | 6322699 B2 | 5/2018 | | |
| JP | 6353036 B2 | 7/2018 | | |

OTHER PUBLICATIONS

International Search Report (ISR) for Application No. PCT/JP2021/041762 dated Dec. 28, 2021.
Translation of the ISR for Application No. PCT/JP2021/041762 dated Dec. 28, 2021.
Written Opinion of the International Search Authority for Application No. PCT/JP2021/041762 dated Dec. 28, 2021.
Korean Office Action for Application No. 10-2022-7032997 dated Aug. 26, 2023.
English translation of Korean Office Action for Application No. 10-2022-7032997 dated Aug. 26, 2023.
Written Opinion of the Singaporean Application No. 11202260489U dated Aug. 18, 2023.

* cited by examiner

ELECTRO-HYDRAULIC ACTUATOR

CROSS-REFERENCE TO RELATED APPLICATIONS

The present application is a national phase entry under 35 U.S.C. § 371 of International Application No. PCT/JP2021/041762, filed Nov. 12, 2021, which claims priority from Japanese Application No. 2020-213583, filed Dec. 23, 2020 and Japanese Application No. 2021-175803, filed Oct. 27, 2021, the entire disclosures of which are hereby incorporated by reference herein.

TECHNICAL FIELD

The present invention relates to an electro-hydraulic actuator.

BACKGROUND ART

An electro-hydraulic actuator includes a gear pump that is operated by a motor and a hydraulic actuator that is operated by a working fluid (such as working oil) pressurized by the gear pump. As the electro-hydraulic actuator, there has been widely known an electric oil hydraulic cylinder using an oil hydraulic cylinder as a hydraulic actuator. In the electric oil hydraulic cylinder, the inside of a cylinder tube in a hollow tube form is filled with working oil as working fluid by a gear pump driven by a motor and a piston is moved in an axial direction of the cylinder tube. Any other mechanism as an operation target is attached to a tip of a piston rod and the operation of the other mechanism is in conjunction with the operation of the electric oil hydraulic cylinder.

The electro-hydraulic actuator is used for an electric lifter brake, for example. In the electric lifter brake, the electro-hydraulic actuator is configured to operate to release a brake pad of a drum brake or disc brake in a powered-on state and to set the brake into a braking state by pressing the brake pad onto the brake drum or brake disc with bias force of a spring or the like once the power is shut off. An electro-hydraulic oil actuator used for an electric oil hydraulic lifter brake is disclosed as an "electrohydraulic brake release device" in PTL 1 or PTL 2 listed below, for example. Additionally, PTL 2 also discloses a brake device using this electrohydraulic brake release device. PTL 3 listed below discloses a "disc brake device" including an electro-hydraulic oil actuator called a "thruster". Note that, NPL 1 listed below describes a structure, characteristics, and so on of a gear pump in relation to the present invention.

LIST OF CITATIONS

Patent Literature

[PTL 1] Japanese Patent No. 6322699
[PTL 2] Japanese Patent No. 6353036
[PTL 3] Japanese Patent Application Publication No. H11-37186

Non-Patent Literature

[NPL 1] JTEKT CORPORATION, "Development of Electric Oil Pump for Automotive Drivetrain", [online], [accessed Dec. 15, 2020] at eb-cat.ds-navi.co.jp/jpn/jtekt/tech/ej/img/no1003/1003_09.pdf>

SUMMARY OF INVENTION

Technical Problem

In the electrohydraulic brake release device (hereinafter, also referred to as a "brake release device" in some cases) described in PTL 1 or 2, a whole internal gear pump and a structure of one end side of a cylinder tube are incorporated inside a metallic block called a "functional unit". Additionally, in this block, a complicated flow channel of a working fluid that is from the internal gear pump to the cylinder tube is constructed. Moreover, by use of the gear pump, the functional unit described in PTL 1 can maintain the brake in the released state once the inside of the cylinder is filled with the working fluid, even without continuous operation of the pump.

However, in the brake release device described in PTL 1 or 2, since many configurations are incorporated in a block, the weight of the brake release device is naturally increased. Additionally, since it is required to create a complicated flow channel in the block with high accuracy, the manufacturing cost is also increased. Moreover, since a wide variety of configurations are incorporated in the block, it is difficult to conduct maintenance and inspection. For example, in order to conduct inspection of the internal gear pump, the block in which many structures are assembled in the brake release device is detached; thus, substantially, the brake release device is disassembled into all the members. Furthermore, when a part of the flow channel is broken for example, the whole functional unit needs to be replaced. For this reason, with the thruster described in PTL 1, the cost for maintenance, inspection, and repair is also increased.

Additionally, any electro-hydraulic actuator, not limited to the brake release devices described in PTLs 1 and 2, is required to have extremely high reliability of a sealing structure in a region in which a motor side and a mechanism side forming an oil hydraulic circuit are coupled with each other in order to prevent leaking of the working oil on the oil hydraulic circuit side to the motor side. In this regard, in the brake release device described in PTL 1 or 2, the internal gear pump is used, and a bearing that joins a motor shaft with a driving shaft to rotate an inner gear of this pump is covered with a housing called a "bearing carrier cover" However, this housing is sealed to the large block while surrounding the large block; for this reason, in the brake release device described in PTL 1 or 2, it is difficult to seal with a uniform strength a wide region in which the bearing carrier cover and the block are coupled with each other.

Under these circumstances, the present invention is made in view of solving the above-described problems, and an object thereof is to provide an electro-hydraulic actuator that has excellent maintainability and high reliability.

Solution to Problem

An aspect of the present invention to achieve the above object is an electro-hydraulic actuator, comprising: a motor configured to output rotative power; an external gear pump configured to be activated by the motor; a hydraulic actuator configured to be operated by a pressurized working fluid supplied by the external gear pump; a manifold block in which a flow channel forming a working fluid circuit of the hydraulic actuator is incorporated; a first portion configured to store the motor; a second portion configured to store the external gear pump, the hydraulic actuator, and a reservoir; and a coupling portion configured to couple the first portion and the second portion with each other in a liquid-tight state, wherein the coupling portion includes a communication hole through which the first portion and the second portion communicate with each other, a rotational shaft of the motor and a driving shaft of the external gear pump are joined to each other in the communication hole, and the external gear pump is attached to the coupling portion while being stored in the manifold block.

Additionally, a scope of the present invention also includes a disc brake device including the electro-hydraulic actuator in which an oil hydraulic cylinder is used as the hydraulic actuator, and the disc brake device comprises a braking mechanism configured to press and separate a brake lining against and from two surfaces of a brake disc in a circular plate form, wherein the braking mechanism releases a braking state for the brake disc in conjunction with a rising movement of the piston rod of the oil hydraulic cylinder and sets the brake disc to the braking state while the piston rod is in a falling state.

Moreover, a problem and a method of solving the problem that are disclosed in the present application are clarified in the field of Description of Embodiments and the drawings.

Advantageous Effects of Invention

According to the present invention, an electro-hydraulic actuator that has excellent maintainability and high reliability is provided.

DESCRIPTION OF EMBODIMENTS

Figure 1A:
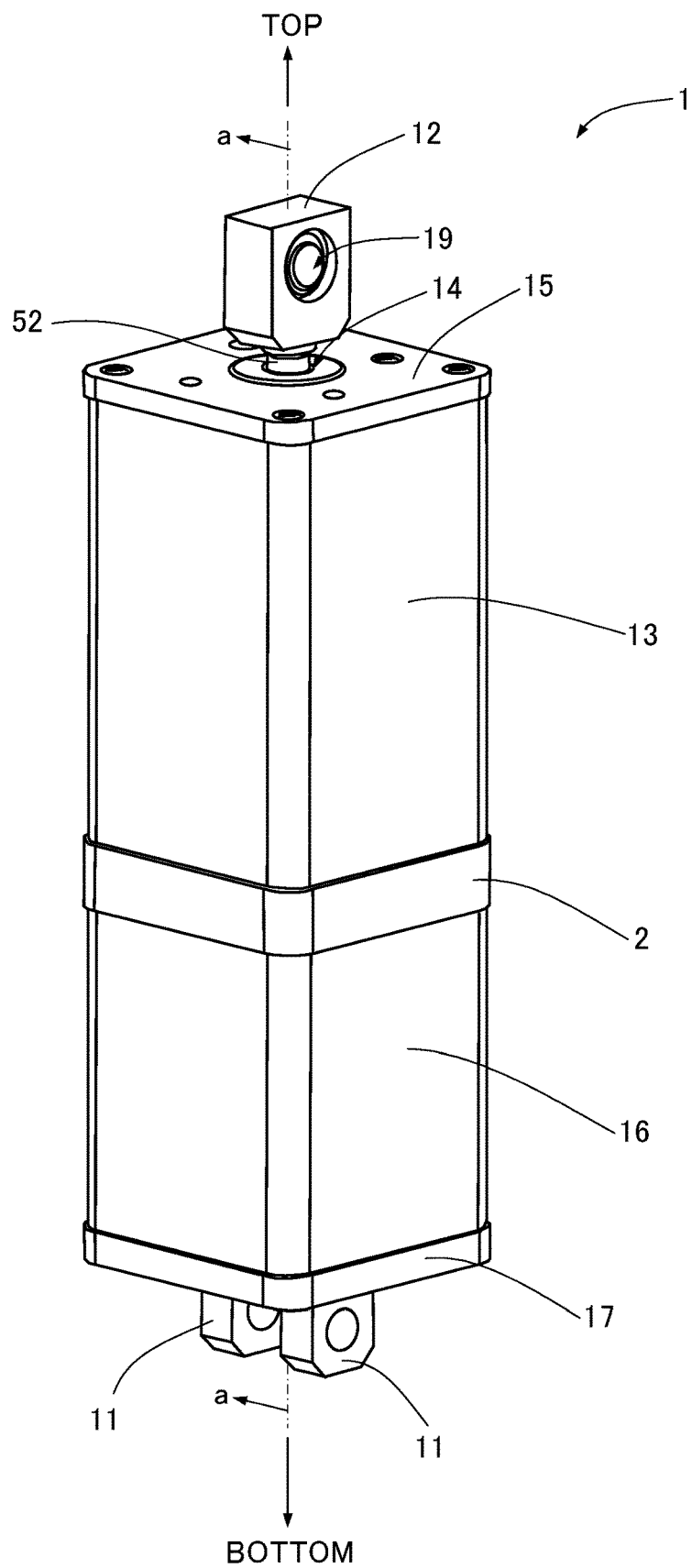
FIG. 1A is an exterior of an electro-hydraulic actuator according to a first embodiment.

An embodiment of the present invention is described below with reference to the appended drawings. Note that, in the drawings used for the following descriptions, the same or similar parts may be provided with the same reference signs to omit duplicated descriptions. Depending on the drawings, a reference sign unnecessary for the description may be omitted. Additionally, hereinafter, for the sake of easy description, a rotational center of any rotational mechanism or a structure, a portion, a member, and the like included in a rotational mechanism may be called a "rotational axis".

First Embodiment

Figure 1B:
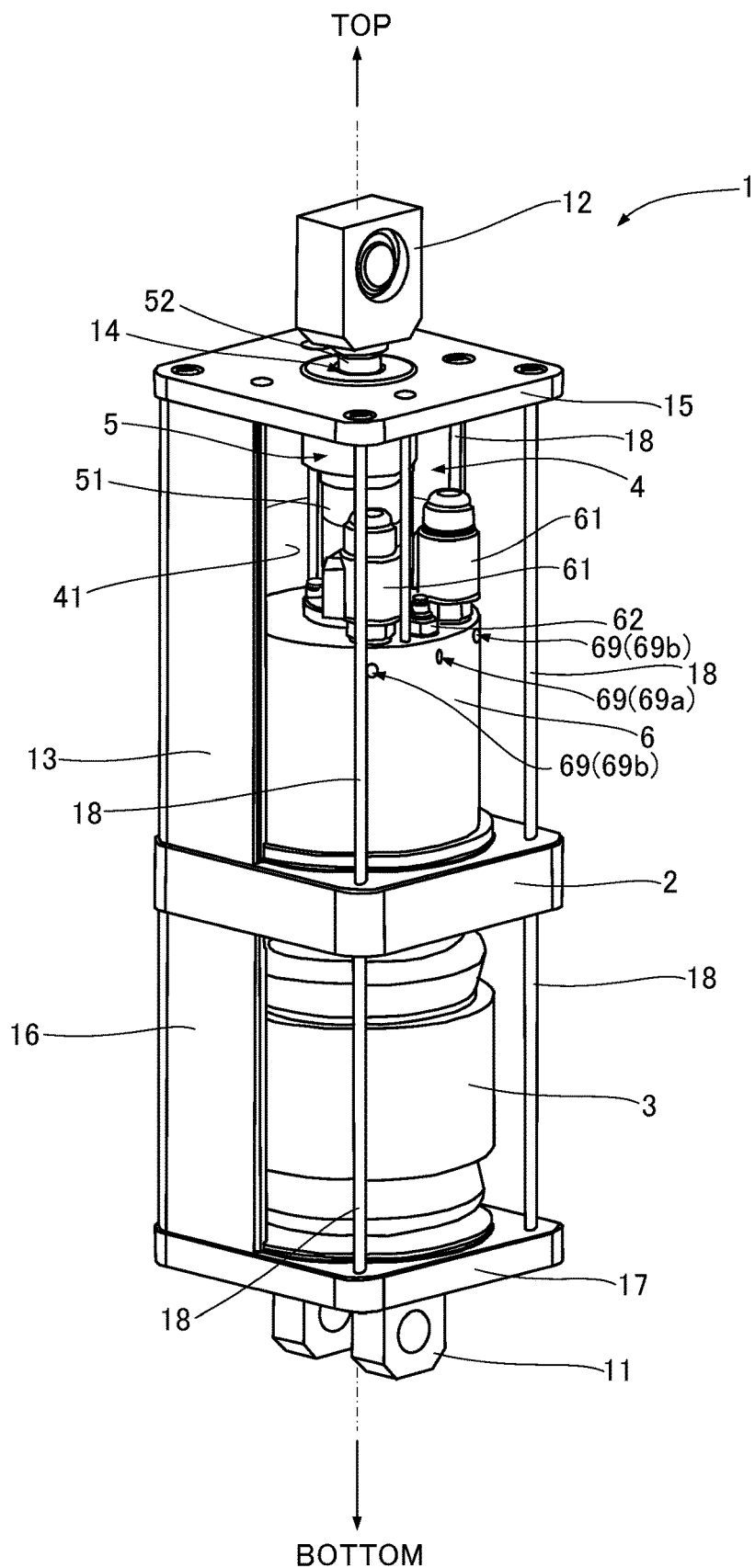
FIG. 1B is an outline of an internal structure of the electro-hydraulic actuator according to the first embodiment.

As an embodiment of the present invention, an electric oil hydraulic cylinder using an oil hydraulic cylinder as a hydraulic actuator is described. FIG. 1A is a diagram illustrating an exterior of an electro-hydraulic actuator according to a first embodiment (hereinafter, also referred to as a "thruster 1" in some cases), and FIG. 1B is a diagram illustrating an outline of an internal structure of the thruster 1. As illustrated in FIG. 1A, the thruster 1 has an exterior shape in a rectangular tube form, and a clevis 11 to fix the thruster 1 to other equipment or the like is attached to one end surface. On the other end side, a tip side of a piston rod 52 of the incorporated oil hydraulic cylinder projects while being capable of reciprocating in an axial direction. At the tip of the piston rod 52, a head 12 coupled to a mechanism (hereinafter, also referred to as an "external mechanism" in some cases) that operates in conjunction with the operation of the thruster 1 is attached. Additionally, in the head 12, a hole to attach the external mechanism (hereinafter, also referred to as a "coupling hole 19" in some cases) is formed.

Each direction to the top and to the bottom is defined assuming that the reciprocation direction of the piston rod 52 is a vertical direction and the piston rod 52 projects toward the upper side of the thruster 1; in this case, the thruster 1 has an entire structure in which an upper structure and a lower structure are coupled with each other through a metallic block 2 in a flat rectangular tube form in which the vertical direction is a thickness direction. The upper structure of the thruster 1 is formed with a member and a mechanism forming the thruster 1 being stored in a chassis (hereinafter, also referred to as an "upper chassis" in some cases) including the metallic block (hereinafter, also referred to as a "coupling block 2" in some cases), a cover in a hollow rectangular tube form (hereinafter, also referred to as an "upper cover 13" in some cases), and a metallic plate (hereinafter, also referred to as a "top lid plate 15" in some cases) including an insertion hole 14 of the piston rod 52. The lower structure includes a chassis (hereinafter, also referred to as a "lower chassis" in some cases) including the coupling block 2, a cover in a hollow rectangular tube form (hereinafter, also referred to as a "lower cover 16" in some cases), and a metallic plate (hereinafter, also referred to as a "base plate 17" in some cases) to which the clevis 11 is attached, and the lower structure is formed with the member and the mechanism forming the thruster 1 being stored in this lower chassis.

As illustrated in FIG. 1B, a motor 3 is disposed in the lower chassis of the thruster 1. The coupling block 2 and the base plate 17 are coupled with each other through an attachment bolt 18, and with fastening of the attachment bolt 18, the lower cover is clamped between the coupling block 2 and the base plate 17 and the lower chassis is thus formed.

The upper chassis is formed by fastening the attachment bolt 18 coupling the coupling block 2 with the top lid plate 15 such that the upper cover is clamped between the coupling block 2 and the base plate 17.

A space in the upper chassis is substantially occupied by a reservoir 4 filled with the working oil. The reservoir 4 is formed of a closed space that is formed of a top surface of the coupling block 2, a reservoir case 41 in a hollow cylinder form that is internally attached coaxially with the upper cover 13 in a hollow rectangular tube form, and a bottom surface of the top lid plate 15. In the thruster 1 according to the first embodiment, a metallic block in a column form (hereinafter, also referred to as a "manifold block 6" in some cases) in which a flow channel of the working oil is formed, an oil hydraulic cylinder 5, various valves (61, 62) arranged in proper positions in an oil hydraulic circuit, and the like are stored in the reservoir 4. Additionally, a lower end side of a cylinder tube 51 as a housing of the oil hydraulic cylinder 5 and the various valves (61, 62) are attached to a top surface of the manifold block 6. Moreover, a gear pump is disposed in a space formed inside the manifold block 6.

Figure 2:
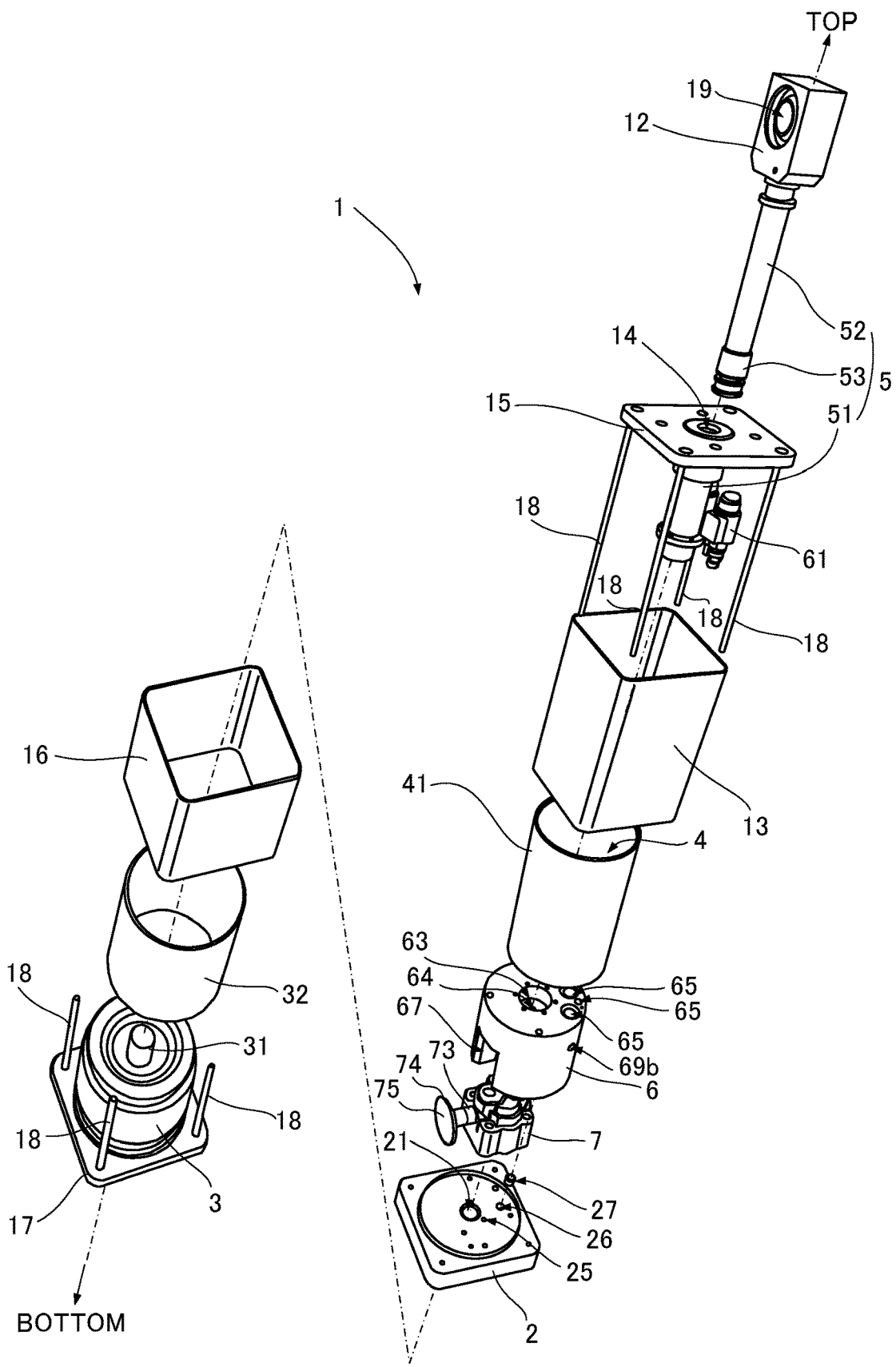
FIG. 2 is a diagram illustrating an outline of the internal structure of the electro-hydraulic actuator according to the first embodiment.
Figure 3:
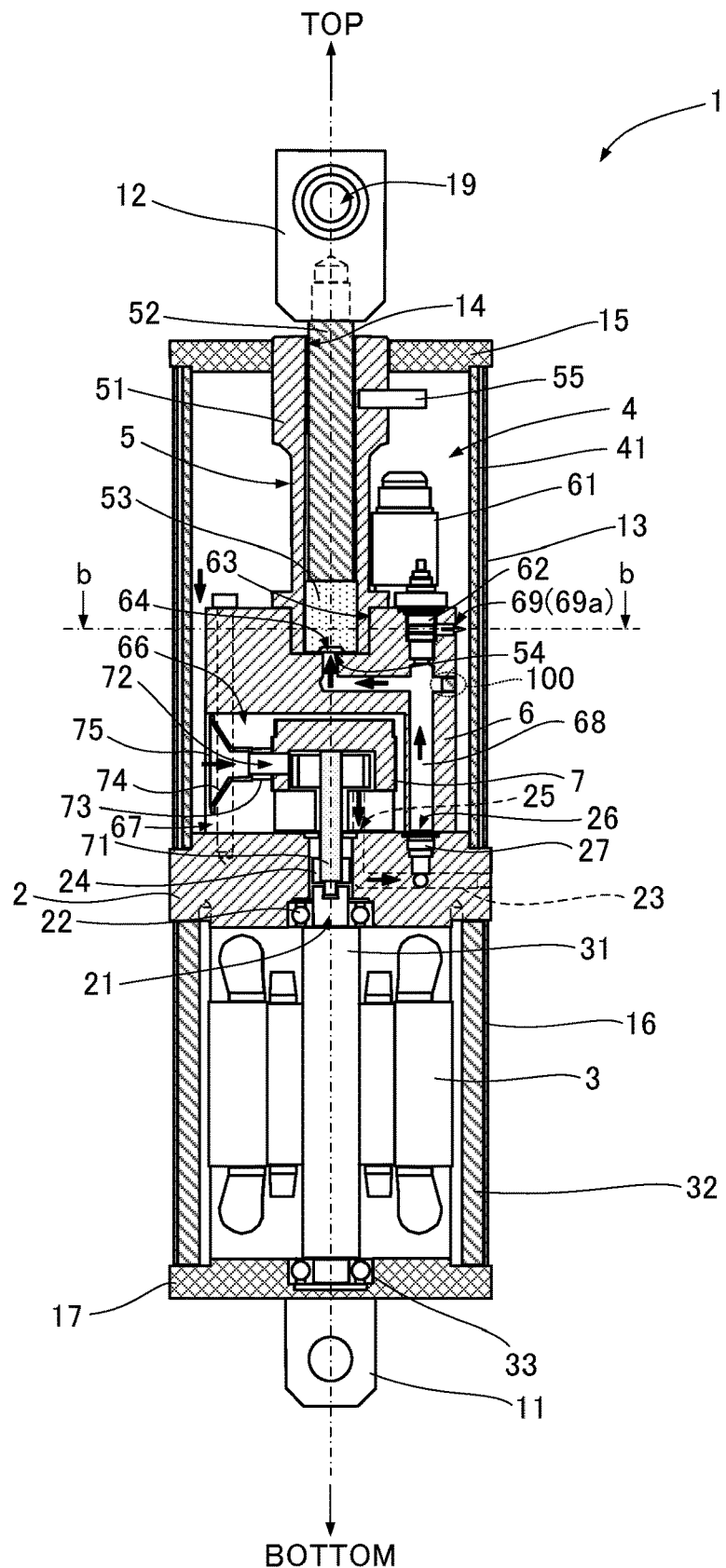
FIG. 3 is a diagram that is a cross-sectional view taken along the line a-a in FIG. 1A and illustrates the internal structure of the electro-hydraulic actuator according to the first embodiment.

FIGS. 2 and 3 illustrates the internal structure of the thruster 1. FIG. 2 is an exploded perspective view of the thruster 1, and FIG. 3 is a cross-sectional view taken along the line a-a in FIG. 1A. Note that, in FIG. 3, a part of the thruster 1 is indicated by hatching to facilitate understanding of the internal structure of the thruster 1. Hereinafter, the configuration and the structure of the thruster 1 are described based on FIGS. 1B, 2, and 3.

The thruster 1 is assembled by sequentially assembling each of the members and the parts forming the structures upper and lower with respect to the coupling block 2 onto the coupling block 2 from above and below. In other words, the thruster 1 can be disassembled by sequentially detaching the members and the parts upward and downward from the coupling block 2.

In the lower chassis, the motor 3 is arranged while being covered with a motor case 32 in a hollow cylinder form. A motor shaft 31 has a rotational axis in the vertical direction and projects upward from the motor case 32. A lower end of the motor shaft 31 is pivotally supported by a bearing 33 using a ball bearing provided in the base plate 17.

In the coupling block 2, a hole (hereinafter, also referred to as a "communication hole 21" in some cases) through which the top surface and a bottom surface communicate with each other is formed, and an upper end side of the motor shaft 31 is inserted into this communication hole 21. In the inside of the coupling block 2, a bearing 22 of the motor shaft 31 using a ball bearing is incorporated, and also a part of a flow channel 23 included in the oil hydraulic circuit is formed. In the present embodiment, a gear pump 7 is an external gear pump, and in the coupling block 2, a tip of the motor shaft 31 is coupled with a tip of a driving shaft 71 of the gear pump (hereinafter, also referred to as an "external gear pump 7" in some cases) through a joining member 24. Thus, the coupling block 2 bears the function of mutually coupling each of the upper and lower structures to itself. Note that, flow channels in the coupling block 2 and the manifold block 6 are formed by forming a hole (hereinafter, also referred to as a "processed hole" in some cases) in a solid metallic block from the outside and sealing an opening of the processed hole with a plug as exemplified in a region 100 of an ellipse of a dotted line in FIG. 3.

An upper end and a lower end of the reservoir case 41 in a hollow cylinder form that is stored in the upper chassis are put in contact with the top surface of the coupling block 2 and the bottom surface of the top lid plate 15 and sealed with an O-ring or the like. With this, the reservoir 4 including a sealed space is formed.

The manifold block 6 in a column form arranged in the reservoir 4 is attached to the coupling block 2, and the flow channel of the working oil and a storage space 66 of the external gear pump 7 are formed therein. A circular recess portion 63 into which a lower end side of the cylinder tube 51 is inserted is formed on the top surface of the manifold block 6, an opening (hereinafter, also referred to as a "recess portion opening 64" in some cases) communicating with an internal flow channel is formed in a bottom portion of this recess portion 63, and a port 54 that allows the working oil to flow in and out through this recess portion opening 64 is provided at a lower end of the cylinder tube 51. Additionally, in the top surface of the manifold block 6, openings 65 that communicate with the internal flow channel and to which the various valves (61, 62) are attached are formed. Moreover, in a proper surface of the manifold block 6, an opening (hereinafter, also referred to as a "discharge port 69" in some cases) for returning the working oil in the flow channel into the reservoir 4 is formed. In the thruster 1 according to the first embodiment, the discharge port 69 is formed in a side surface of the manifold block 6. Furthermore, once the valves (61, 62) are attached to the manifold block 6, a valve mechanism of each valve (61, 62) is disposed so as to be arranged between predetermined flow channels in the manifold block 6.

On a bottom surface side of the manifold block 6, the storage space 66 of the external gear pump 7 that is a hollow in a cylinder form is formed. The external gear pump 7 is arranged in the storage space 66 while being attached to the coupling block 2. In the external gear pump 7, a suction port 72 of the working oil is opened on a side orthogonal to the vertical direction, and a bell mouth 74 is attached to this opening through a joint pipe 73. Note that, at an opening end of the bell mouth 74, a suction filter 75 that filtrates a foreign substance in the working oil is attached. Additionally, an opening portion 67 formed as a notch in a rectangular shape is formed on a side surface of the manifold block 6 in a column form. This opening portion 67 communicates with the storage space 66 of the external gear pump 7 and exposes the bell mouth 74 of the external gear pump 7 to the outside of the manifold block 6 within the reservoir 4.

Figure 4A:
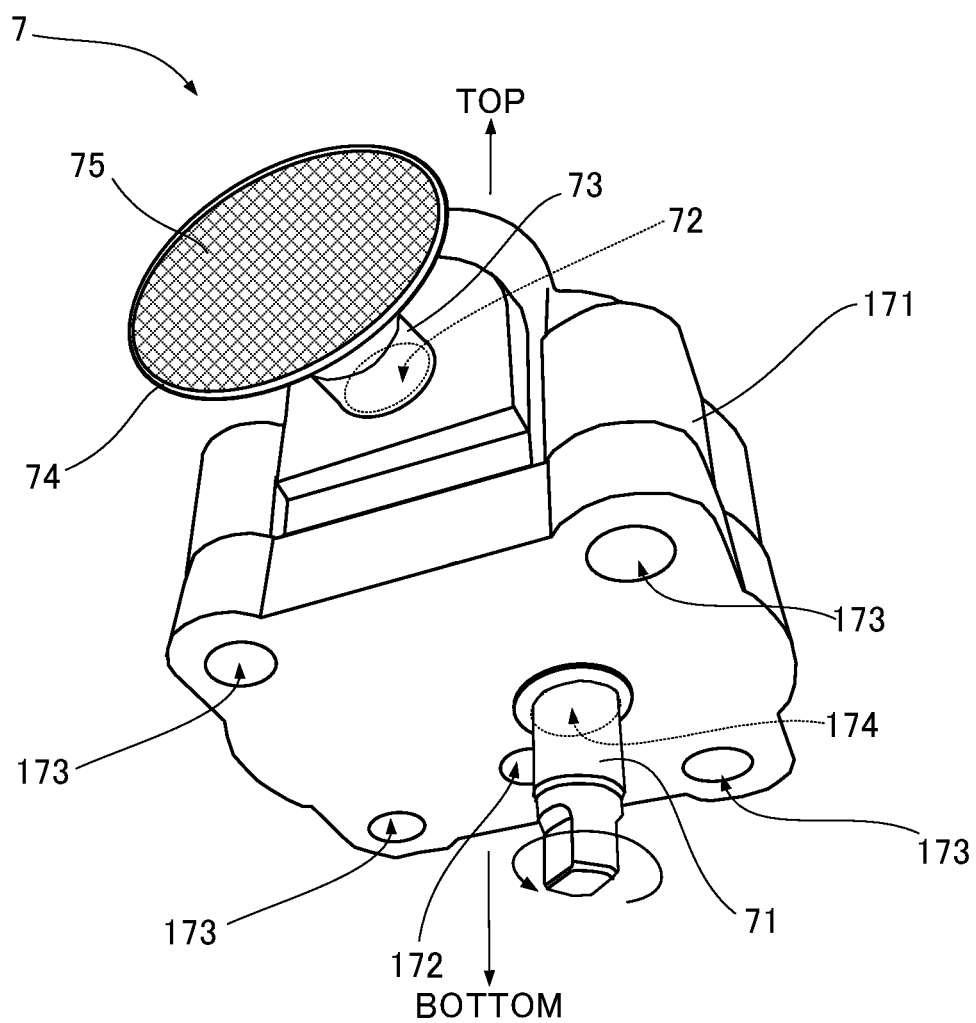
FIG. 4A is a diagram illustrating an exterior of a gear pump forming the electro-hydraulic actuator according to the first embodiment.
Figure 4B:
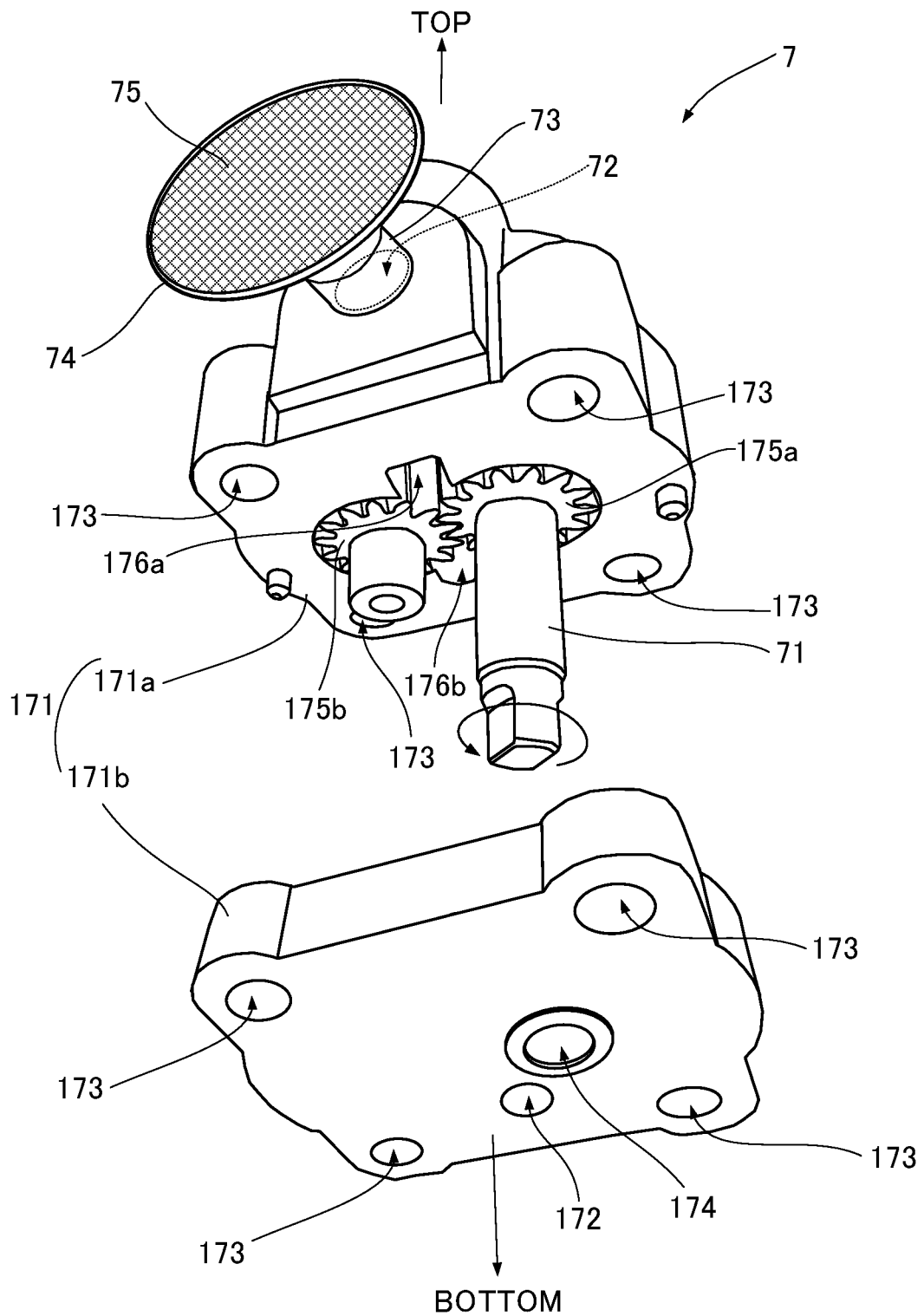
FIG. 4B is a diagram illustrating an internal structure of the gear pump forming the electro-hydraulic actuator according to the first embodiment.

FIGS. 4A and 4B illustrate a structure of the external gear pump 7. FIG. 4A is a diagram illustrating an exterior of the external gear pump 7, and FIG. 4B is a diagram illustrating an internal structure of the external gear pump 7. As illustrated in FIG. 4A, the driving shaft 71 of the external gear pump 7 projects downward through a shaft hole 174 formed in a bottom surface of a chassis (hereinafter, also referred to as a "pump case 171" in some cases). Additionally, in the bottom surface of the pump case 171, an ejection port 172 of the working oil is opened. Moreover, in the pump case 171, insertion holes 173 of bolts for attaching itself to the coupling block 2 is also formed penetrating in the vertical direction.

As illustrated in FIG. 4B, the pump case 171 includes a case main body 171*a* in which a storage space of gears (175*a*, 175*b*) is formed and a cover portion 171*b* covering a bottom surface side of the case main body 171*a*, and the case main body 171*a* and the cover portion 171*b* are assembled integrally with a bolt and the like.

In the case main body 171*a*, a gear (hereinafter, a driving gear 175*a*) that pivotally supports the driving shaft 71 and a gear (hereinafter, a driven gear 175*b*) that is meshed with the driving gear 175*a* are incorporated. In a region in which the driving gear 175*a* and the driven gear 175*b* are meshed with each other, a pressure chamber (hereinafter, also referred to as a "suction side pressure chamber 176*a*" in some cases) that communicates with the suction port 72 and a pressure chamber (hereinafter, also referred to as an "ejection side pressure chamber 176*b*" in some cases) that communicates with the ejection port 172 are formed. Additionally, in the external gear pump 7, once the driving gear 175*a* rotates in a counterclockwise manner viewed from below, the working oil transported from the suction port 72 to the suction side pressure chamber 176*a* is transported to an ejection side pressure chamber 176*b* side and is ejected from the ejection port 172 by way of this ejection side pressure chamber 176*b*.

Referring back to FIGS. 2 and 3, in the thruster 1, the external gear pump 7 is fixed on the top surface of the coupling block 2 with a bolt (not illustrated). In the top surface of the coupling block 2, an inlet 25 of the working oil that is one end of the flow channel 23 formed inside the coupling block 2 is opened in a position corresponding to the ejection port 172 of the external gear pump 7. The other end of the flow channel 23 is opened as an outlet 26 of the working oil in the top surface of the coupling block 2. Once the manifold block 6 is attached to the coupling block 2, an inlet of the working oil in the manifold block 6 corresponds to the position of the above-described outlet 26 in the coupling block 2, and the flow channel 23 in the coupling block 2 and a flow channel 68 in the manifold block 6 are coupled to each other. Note that, a check valve 27 is attached to the outlet 26 of the working oil in the coupling block 2 such that the working oil ejected from the external gear pump 7 is prevented from flowing backward from the flow channel 68 on a manifold block 6 side to the flow channel 23 on a coupling block 2 side.

Figure 5:
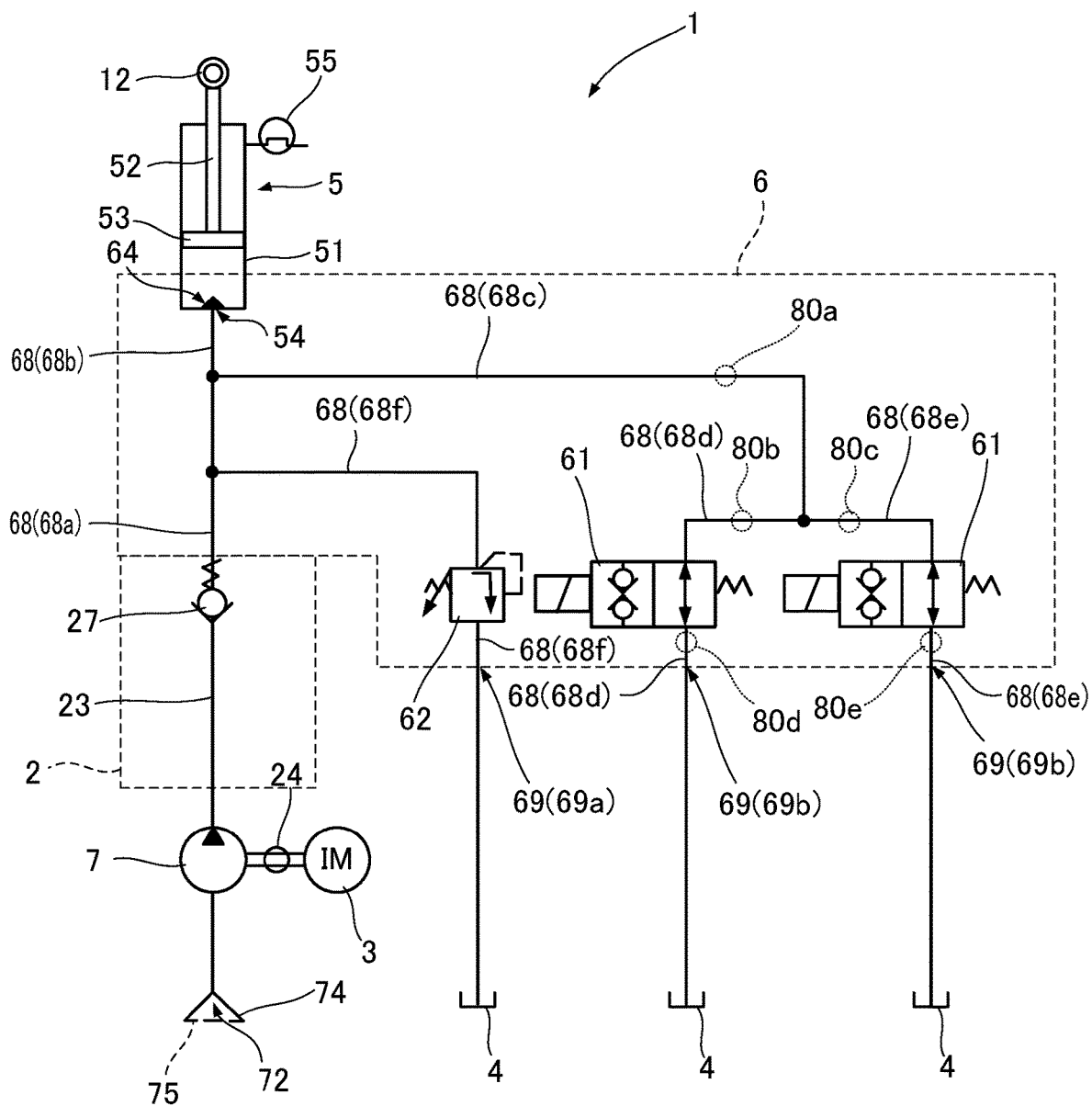
FIG. 5 is a diagram illustrating an oil hydraulic circuit of the electro-hydraulic actuator according to the first embodiment.
Figure 6A:
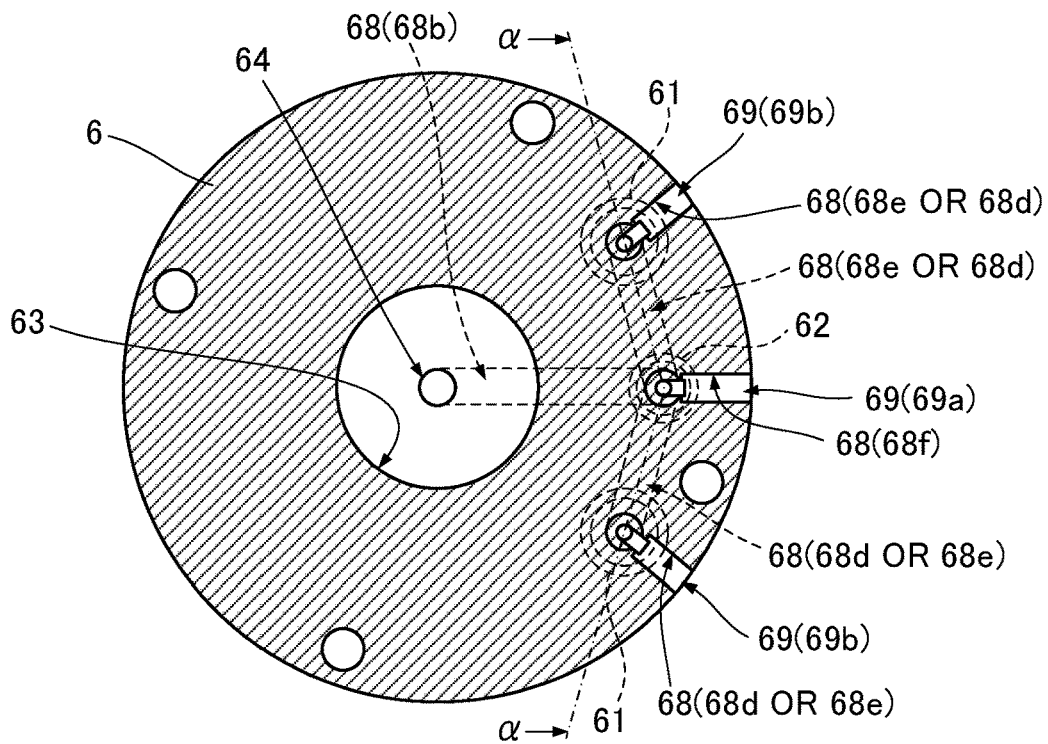
FIG. 6A is a diagram illustrating a cross section taken along the line b-b in FIG. 3.
Figure 6B:
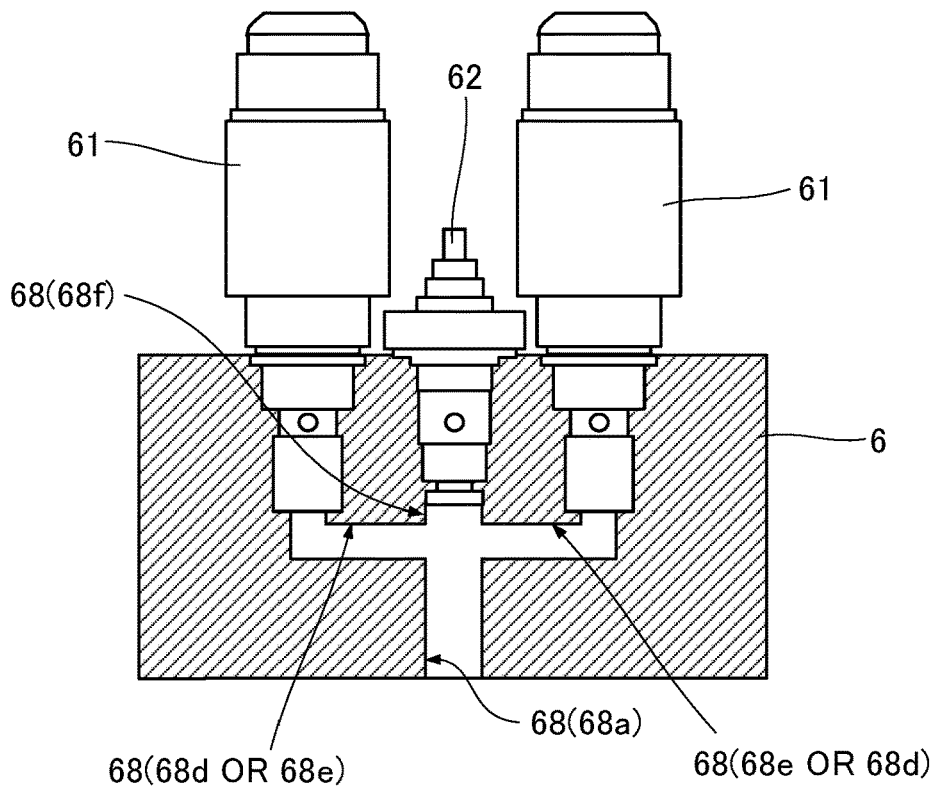
FIG. 6B is a diagram illustrating a cross section taken along the line a-a in FIG. 6A.

FIG. 5 illustrates an oil hydraulic circuit in the thruster 1. Additionally, FIG. 6A illustrates a cross-sectional view taken along the line b-b in FIG. 3, and FIG. 6B illustrates a cross-sectional view taken along the line a-a in FIG. 6A. Note that, in FIGS. 6A and 6B, only a cross section of the manifold block 6 is illustrated. Additionally, in the drawings indicated below including FIGS. 6A and 6B, to facilitate understanding of the shape of the flow channel, a portion and a member that do not function as the flow channel substantially such as a processed hole for creating the manifold block 6 and a plug to close an opening of the processed hole are omitted. As a matter of course, the flow channel in the oil hydraulic circuit illustrated in FIG. 5 does not directly reflect the states of divergence and convergence of actual flow channels incorporated in the actual coupling block 2 and manifold block 6.

Hereinafter, an operation of the thruster 1 is described with reference to FIGS. 2 to 5, 6A, and 6B. As illustrated in FIG. 5, in the manifold block 6, a single flow channel that continues from the flow channel 23 in the coupling block 2 is diverged into multiple flow channels (68*b* to 68*f*) in the manifold block 6. One of the diverged flow channels (68*b* to 68*f*) that is 68*b* is the flow channel 68*b* that is guided to the inlet (hereinafter, referred to as the "port 54" in some cases) of the working oil in the cylinder tube 51 attached to the top surface of the manifold block 6. Note that, hereinafter, a flow channel from the inlet 25 of the coupling block coupled to the ejection port 172 of the external gear pump 7 to the recess portion opening 64 of the manifold block 6 coupled to the port 54 of the oil hydraulic cylinder 5 is referred to as a "pressurization flow channel" in some cases.

The other diverged flow channels (68*c* to 68*f*) are flow channels to return the working oil in the cylinder tube 51 to the reservoir 4, and in the present embodiment, two types of flow channels (68*c* to 68*e* and 68*f*) are formed in the manifold block 6 to return the working oil into the reservoir 4. One (68*c* to 68*e*) of the two types of the flow channels (68*c* to 68*e* and 68*f*) is the flow channels (68*c* to 68*e*) in which a solenoid valve 61 is arranged to return the working oil in the cylinder tube 51 to the reservoir 4. Note that, hereinafter, the flow channel for returning the working oil in the cylinder tube 51 from the port 54 into the reservoir 4 by way of the solenoid valve 61 is referred to as a "depressurization flow channel" in some cases.

Additionally, in the thruster 1 according to the first embodiment, the depressurization flow channel from the recess portion opening 64 is diverged into two on the way to the reservoir 4, and the solenoid valve 61 is arranged for each of the diverged two flow channels (68*d*, 68*e*). The other one of the two types of the flow channels (68*c* to 68*e* and 68*f*) that is 68*f* is the flow channel 68*f* in which a relief valve 62 is arranged to adjust the oil pressure in the cylinder tube 51. Note that, hereinafter, the flow channel 68*f* from the relief valve 62 to the reservoir 4 is also referred to as a "pressure adjustment flow channel" in some cases. Additionally, in the thruster 1 according to the first embodiment, one ends of the flow channel 68*c* forming the depressurization flow channel before the divergence and the pressure adjustment flow channel 68*f* communicate with the pressurization flow channel while the other ends communicate with the openings formed in the top surface of the manifold block 6 (FIGS. 2 and 3, reference sign 65), and the predetermined valves (61, 62) are attached to these openings 65, respectively.

Next, the operation of the thruster 1 is described. A signal line in the thruster 1 or electric wiring such as an electric supply line to the motor 3 and the solenoid valve 61 is guided from the inside of the thruster 1 to an external electric circuit while being sealed. Then, once the thruster 1 is powered on, the motor 3 is activated, and the solenoid valve 61 is in a closed state. The external gear pump 7 driven by the motor 3 transports the working oil from the ejection port 172, and this working oil is supplied from the port 54 of the oil hydraulic cylinder 5 into the cylinder tube 51 through the pressurization flow channel. With this, a piston 53 is pushed upward. For reference, a route of the working oil while the piston 53 is pushed up is indicated by a black-colored arrow in FIG. 3.

In the cylinder tube 51, a proximity sensor 55 is arranged at a vertical position corresponding to top dead center of the piston 53. A control device using a relay and a computer that activates and stops the motor 3 with a signal from the proximity sensor 55 is provided along with the thruster 1, and when the inside of the cylinder tube 51 is filled with the working oil and the proximity sensor 55 detects that the piston 53 is moved to the top dead center, the rotational operation of the motor 3 is stopped. The piston 53 of the oil hydraulic cylinder 5 is against downward bias force from the external mechanism by the oil pressure in the cylinder tube 51 and maintains the vertical position. Note that, once the oil pressure in the pressure adjustment flow channel 68f exceeds a predetermined pressure, the relief valve 62 is opened, and the working oil in the cylinder tube 51 is returned to the reservoir 4.

Once the thruster 1 is powered off, the valve mechanism of the solenoid valve 61 is in an open state, and the piston 53 is pushed down by downward bias force from the external mechanism coupled to the head 12 attached to the tip of the piston rod 52. With this, the working oil in the cylinder tube 51 is returned to the reservoir 4 through the depressurization flow channel passing through the solenoid valve 61.

Thus, in the thruster 1 having the above-described configuration, the upper and the lower structures are coupled to each other through the coupling block 2 in which the bearing 22 of the motor shaft 31 and the flow channel 23 of the working oil forming a part of the oil hydraulic circuit are formed. Thus, as described above, the thruster 1 has a simple structure that can be easily disassembled and assembled by merely detaching the various members and parts forming the thruster 1 upward and downward from the coupling block 2 or assembling to the coupling block from the above or below. Additionally, the manifold block 6 forming the oil hydraulic circuit and the external gear pump 7 are detached as a single body. Therefore, a maintenance work of the thruster 1 is extremely easy.

Additionally, in the thruster 1 according to the first embodiment, the flow channels (23, 68) of the oil hydraulic circuit are divided into the coupling block 2 and the manifold block 6, and even if the routes of the flow channels (23, 68) of the entire oil hydraulic circuit are complicated, the flow channels formed in the coupling block 2 and the manifold block 6 can have a relatively simple structure. Accordingly, the processing cost to form the flow channels (23, 68) is also reduced. Moreover, in the thruster 1 according to the first embodiment, if a part of the flow channels (23, 68) of the oil hydraulic circuit has a failure, it is only necessary to replace either one of the coupling block 2 and the manifold block 6 that includes the flow channel with a failure, and the cost required for repair can also be reduced.

In the thruster 1 according to the first embodiment, the motor 3 and the mechanism including the oil hydraulic circuit are arranged so as to be separated from each other into the top and bottom spaces by the coupling block 2. Additionally, a route through which the top and bottom spaces communicate with each other is only the communication hole 21 formed in the coupling block 2. Therefore, the motor 3 and the mechanism including the oil hydraulic circuit can be separated from each other in a liquid-tight state reliably only by sealing a peripheral edge of the communication hole 21 with an O-ring or the like. Accordingly, the thruster 1 according to the embodiment has a high reliability.

Furthermore, the thruster 1 according to the first embodiment using the external gear pump 7 has more advantages than a thruster using an internal gear pump. For example, as described in the above-described NPL 1, the external gear pump 7 can set the oil pressure higher than the internal gear pump does. Therefore, the rising operation of the piston rod 52 in the thruster 1 and the operation of the external mechanism coupled to the head 12 can be in conjunction with each other reliably.

In the external gear pump 7, even in a case where a foreign substance is mixed therein, if the foreign substance has a size that passes between cogs of the gears (175a, 175b) and is smaller than the suction port 72 and the ejection port 172, the foreign substance is discharged to the outside easily. Therefore, the resistance to the contamination of the working oil is higher than that of the internal gear pump in which an inner rotor is incorporated in an outer rotor. The external gear pump 7 does not require an outer rotor having a complicated shape in which a gear is formed at inner periphery and can be manufactured easily and created or obtained inexpensively.

In the thruster 1 according to the first embodiment, the oil hydraulic cylinder 5, the external gear pump 7, and the various valves (61, 62), which are movable mechanisms, are stored in the reservoir 4 filled with the working oil. In other words, the thruster 1 has a structure in which these movable mechanisms are immersed in the working oil. With this, in the thruster 1 according to the embodiment, noise from the movable mechanisms is unlikely to be leaked to the outside, and high quietness is achieved. Particularly, as described in the above-described NPL 1, the external gear pump 7 has a problem that the noise is greater than that of the internally attached pump; however, the noise due to the external gear pump 7 can be also reduced in the thruster 1 according to the first embodiment.

In the thruster 1 according to the first embodiment, the depressurization flow channel is diverged into the two flow channels (68d, 69e) such that the working oil in the cylinder tube 51 is returned to the reservoir 4 promptly. Thus, the oil pressure in the cylinder tube 51 is depressurized promptly, and the piston 53 reaches bottom dead center in a short time.

Here, assuming that the thruster 1 according to the first embodiment is applied to the disc brake device described in the above-described PTL 3 or the like for example, the head 12 attached to the tip of the piston rod 52 of the oil hydraulic cylinder 5 is coupled to a mechanism that presses and separates a brake lining against and from two surfaces of a brake disc in a circular plate form. This mechanism is configured to release a braking state for the brake disc in conjunction with the rising movement of the piston rod 52 and to set the brake disc to the braking state while the piston rod 52 is falling. Thus, if the thruster 1 according to the first embodiment is used for this kind of a disc brake device, immediate braking can be applied to the rotating brake disc when the disc brake device is powered off. With this, the brake disc that tries to keep rotating is stopped promptly, and the secureness of the disc brake device can be enhanced. Note that, an example of a basic structure, configuration, and operation in the disc brake device is described in the above-described PTL 3.

===Flow Velocity Adjustment Mechanism of Working Fluid===

In the thruster 1 according to the first embodiment, once the solenoid valve 61 is in the open state while the external mechanism is coupled to the head 12 attached to the tip of the piston rod 52, the piston rod 52 is pushed downward by the external mechanism and also the working oil in the cylinder tube 51 is returned to the reservoir 4.

In this case, if the bias force of the external mechanism to push the piston rod 52 downward is excessively strong, there may be a possibility that the piston rod 52 falls rapidly, a lower end of the piston rod 52 crushingly collides with a bottom surface in the cylinder tube 51, and excessive impact is applied to the thruster 1. If the excessive impact is applied to the thruster 1, there may be a possibility that the thruster 1 breaks down because, for example, a bolt fastened to each portion of the thruster 1 is loosened. Additionally, if reaction force of the impact applied to the thruster 1 is transmitted to the external mechanism, there may be a possibility that unnecessary vibration occurs in the external mechanism, and it becomes difficult to operate the external mechanism with high accuracy.

In view of this, in the oil hydraulic circuit of the thruster 1 according to the first embodiment illustrated in FIG. 5, a throttle mechanism for reducing a flow velocity of the working oil may be disposed in the middle of the depressurization flow channel. For example, the throttle mechanism can be inserted into any one of positions 80a to 80e indicated by a circle of a dotted line in the oil hydraulic circuit illustrated in FIG. 5.

Note that, the throttle mechanism may include a throttle valve and an orifice. Since the throttle valve can variably adjust the flow velocity, in a case of employing the throttle valve in each of the thruster 1 used for being coupled to a variety of the external mechanisms and the thruster 1 of a wide variety in small quantities, an opening degree of the throttle with respect to each thruster can be finely adjusted depending on the application. On the other hand, the throttle valve has an individual difference in a relationship between the adjustment amount of the opening degree and the opening degree of an actual valve, and in a case where a multiple number of the same thrusters 1 are manufactured to be used for being coupled to the same external mechanism, a work to adjust the opening degree of the throttle valve is required for each of the manufactured thrusters 1.

In contrast, the orifice that is a fixed throttle has less individual difference, and as long as the opening degree of the throttle in accordance with the external mechanism is defined, multiple orifices with a defined opening degree may be manufactured. Additionally, each of the multiple orifices set to the defined opening degree may be incorporated into each of the multiple same thrusters 1. Thus, the thruster 1 using the orifice as the throttle mechanism can reduce the cost for adjusting the opening degree of the throttle. Additionally, the orifice including no movable portion is less expensive than the throttle valve, and the parts cost in the thruster 1 can also be reduced.

Figure 7:
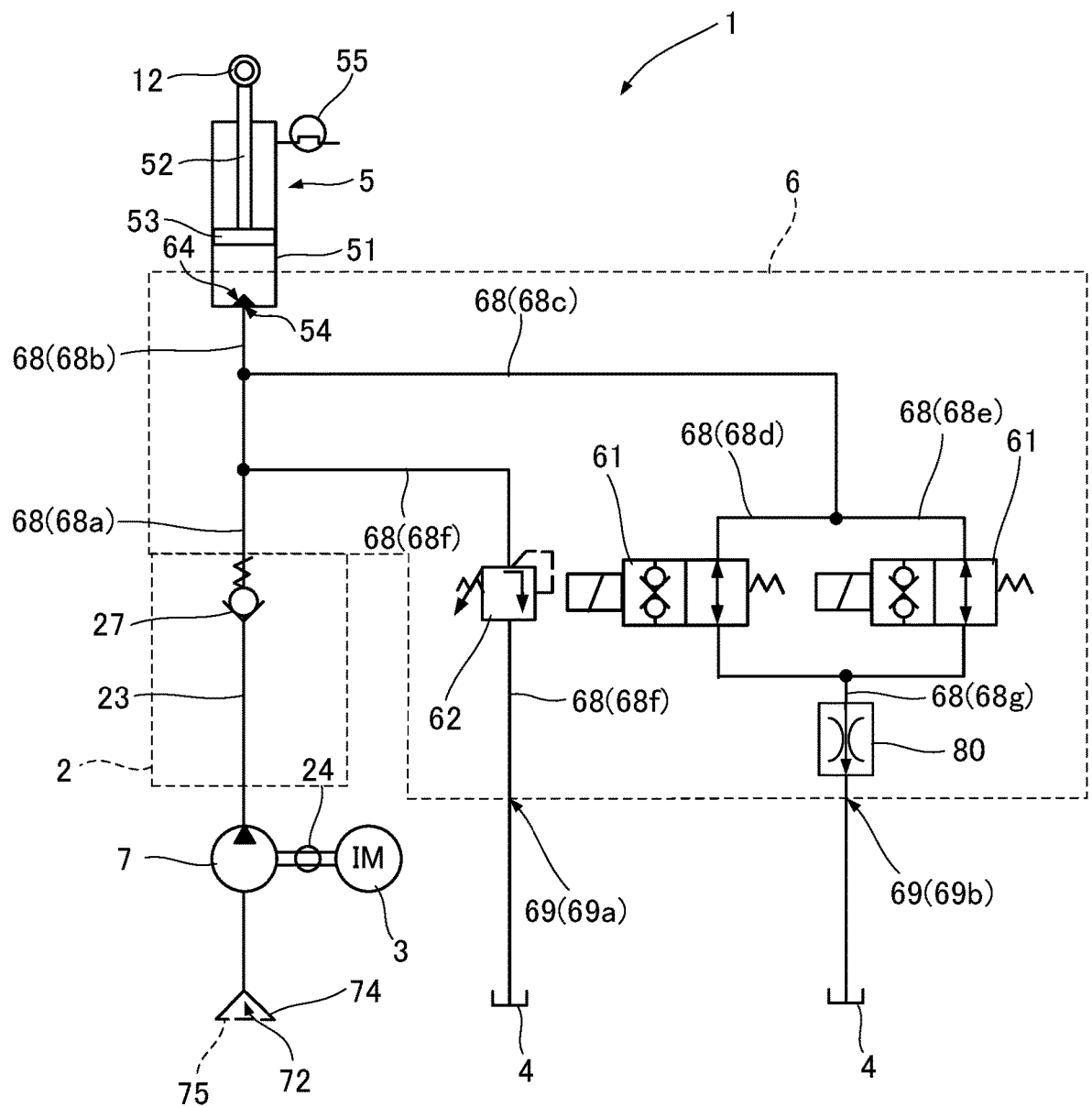
FIG. 7 is a diagram illustrating the oil hydraulic circuit of an electric actuator according to the first embodiment that is provided with an orifice.

FIG. 7 illustrates an example of the oil hydraulic circuit of the thruster 1 in which an orifice 80 is provided as the throttle mechanism. In the oil hydraulic circuit illustrated in FIG. 7, the flow channels (68b, 68c) from the recess portion opening 64 to the reservoir 4 are diverged into the two flow channels (68d, 68e), and each of the diverged two flow channels (68d, 68e) passes through the solenoid valve 61 and is converged again into a single flow channel 68g to reach a discharge port 69b. Additionally, the orifice 80 is inserted into the converged flow channel 68g. Note that, in the thruster 1 including the oil hydraulic circuit illustrated in FIG. 7, the number of the orifice 80 is one, and the parts cost on the throttle mechanism can be further reduced.

Here, in order to confirm an effect of the flow velocity adjustment of the working oil by the orifice 80, the thruster 1 including the oil hydraulic circuit illustrated in FIG. 5 and the thruster 1 including the oil hydraulic circuit illustrated in FIG. 7 were prepared, and the disc brake device described above was coupled as the external mechanism into the coupling hole 19 of the head 12 provided at the tip of the piston rod 52 of each thruster 1. Then, the solenoid valve 61 was opened while the inside of the cylinder tube 51 of each thruster 1 is filled with the working oil and the piston 53 is being pushed upward, and the strength of the impact applied to the thruster 1 when the piston rod 52 is pushed down by the disc brake device was measured.

Figure 8:
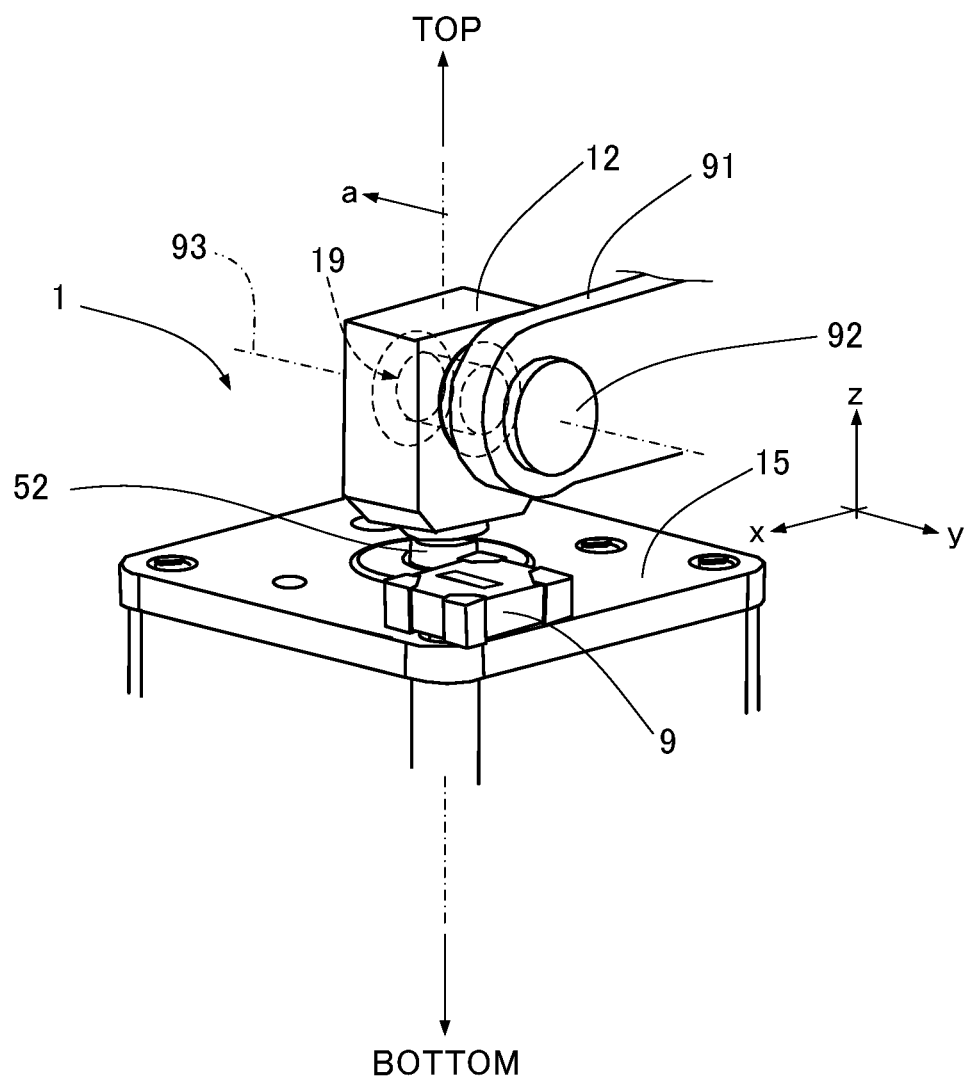
FIG. 8 is a diagram illustrating a method of measuring the strength of an impact applied to the electric actuator according to the first embodiment.

FIG. 8 illustrates a method of measuring the strength of the impact. FIG. 8 is a diagram in which an upper portion of the thruster 1 is enlarged, and as illustrated in FIG. 8, an external mechanism 91 was coupled through a member in a pillar form (hereinafter, also referred to as a "coupling rod 92" in some cases) pivotally supported in the coupling hole 19 of the head 12, and a shock recorder (G-MEN GR20, manufactured by SRIC Corporation, hereinafter, also referred to as an "impact sensor 9" in some cases) was attached to a top surface of the top lid plate 15. Note that, in the thruster 1 according to the first embodiment, a rising and falling direction of the piston rod 52 is the vertical direction, and an axis 93 of the coupling rod 92 pivotally supported in the head 12 is orthogonal to the vertical direction. Additionally, the top surface of the top lid plate 15 is parallel to a plane in which the vertical direction is normal.

The impact sensor 9 is provided with a function of measuring acceleration in each of three axial directions, x, y, and z, which are orthogonal to each other, at a predetermined sampling cycle (for example, 1 ms) and also recording the measured acceleration. In this case, the impact sensor 9 was attached while the vertical direction is the z axial direction, an extending direction of the axis 93 of the coupling rod 92 is a y axis, and a direction orthogonal to both the z axis and y axis is the x axial direction. Then, acceleration in each of the x axial direction and the z axial direction until the piston rod 52 is pushed down to the bottom dead center from the top dead center by the external mechanism 91 was measured by the impact sensor 9. Then, the maximum acceleration recorded in the impact sensor 9 was treated as the strength of the impact.

Note that, since the working oil has a viscosity that is changed depending on temperature, in a case of measuring a speed, the oil temperature was monitored by a temperature sensor disposed in the reservoir 4. In other words, in the thruster 1 according to the first embodiment, the solenoid valve 61 is disposed in the reservoir 4, and the valve mechanism of the solenoid valve 61 is arranged in the flow channel 68 while being embedded in the manifold block 6. As widely known, the solenoid valve 61 is configured to drive the valve mechanism by a solenoid using an electromagnet, and the electromagnet heats when the valve mechanism is driven. Thus, in the thruster 1 according to the first embodiment, the temperature of the working fluid in the reservoir 4 rises along with the open-close operation of the solenoid valve 61. Additionally, a rise in the oil temperature reduces the viscosity of the working oil and increases the flow velocity of the working oil in the flow channel. As the temperature of the working fluid rises, the speed of pushing down the piston rod 52 by the external mechanism 91 when the solenoid valve 61 is opened is increased, and the impact applied to the thruster 1 is increased.

The following Table 1 indicates a relationship between the presence/absence of the orifice 80 and the strength of the impact at the same oil temperature and a relationship between the oil temperature and the strength of the impact in the thruster 1 including the orifice 80.

TABLE 1

| ORIFICE | DIRECTION | OIL TEMPERATURE | | |
| --- | --- | --- | --- | --- |
| | | 34° C. | 54° C. | 70° C. |
| ABSENT | x | 5.6 G | — | — |
| | z | 3.0 G | — | — |
| PRESENT | x | 1.4 G | 1.3 G | 1.2 G |
| | z | 0.2 G | 0.2 G | 0.2 G |

As indicated in Table 1, it is confirmed that the thruster 1 in which the orifice 80 is inserted in the depressurization flow channel can reduce the impact more than the thruster 1 in which the orifice 80 is not inserted. Additionally, it is also confirmed that, in the thruster 1 including the orifice, the strength of the impact is not greatly affected by the oil temperature. It can be considered that this is because the distance in which the working oil passes through is short in the throttle mechanism of the orifice 80 and thus the flow velocity is not easily affected by the oil temperature.

Second Embodiment

As described above, in the thruster 1 according to the first embodiment, since the solenoid valve 61 is disposed in the reservoir 4, the oil temperature of the working oil may rise when the solenoid valve 61 is operated frequently. It is apparent that, in the thruster 1 according to the first embodiment, with the orifice 80 being inserted in the middle of the depressurization flow channel, it is possible to maintain the flow velocity of the working oil substantially constant without depending on the oil temperature. However, if the oil temperature can be maintained at a constant temperature, it is possible to control the flow velocity of the working oil in the flow channel more accurately. As a matter of course, depending on the external mechanism 91 coupled to the thruster 1, the flow velocity does not need to be reduced and the orifice 80 is unnecessary in some cases. In view of this, as a second embodiment, a thruster that is capable of inhibiting a rise in the oil temperature due to the solenoid valve 61 is described.

Figure 9:
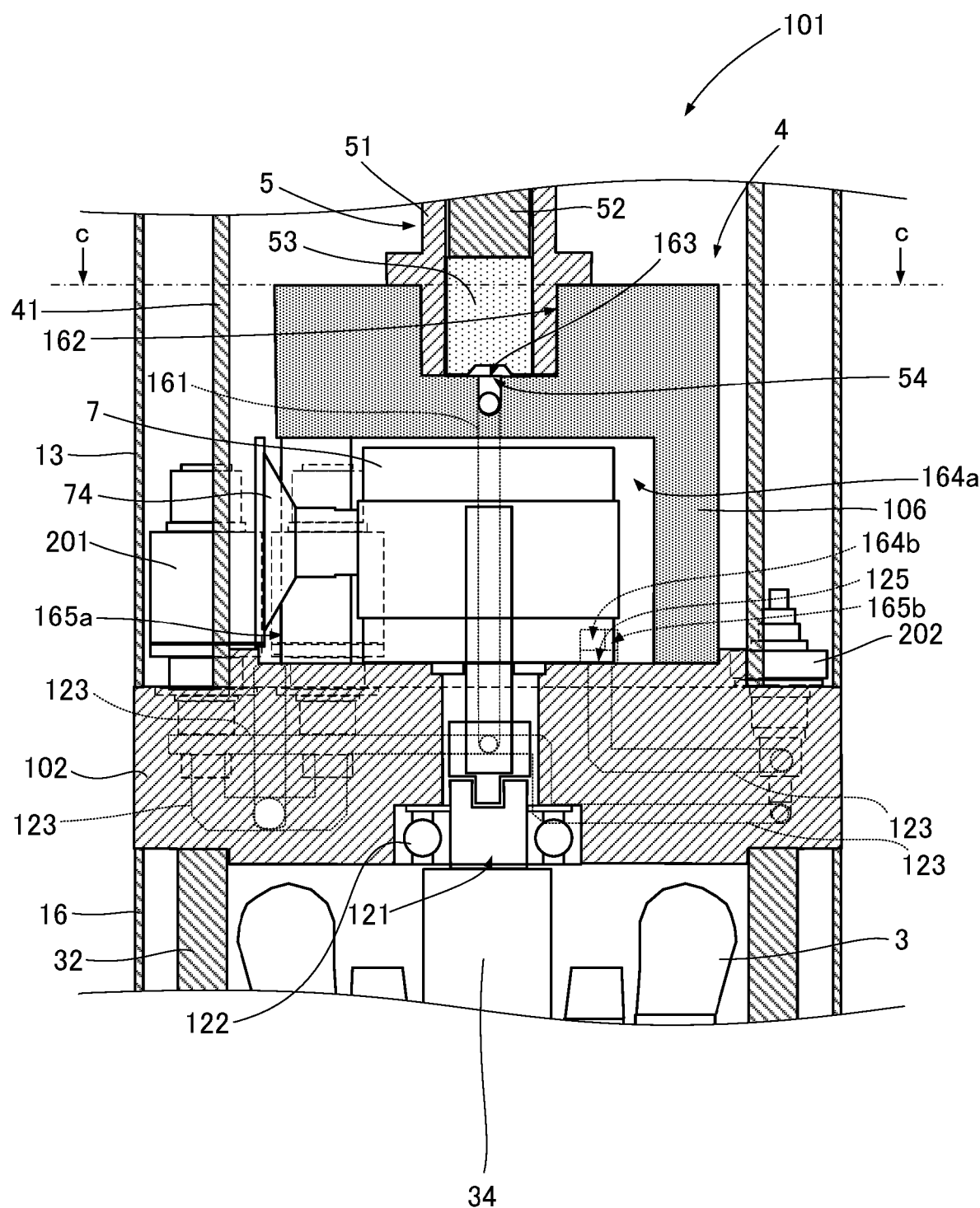
FIG. 9 is a cross-sectional view illustrating an internal structure of an electro-hydraulic actuator according to a second embodiment.
Figure 10:
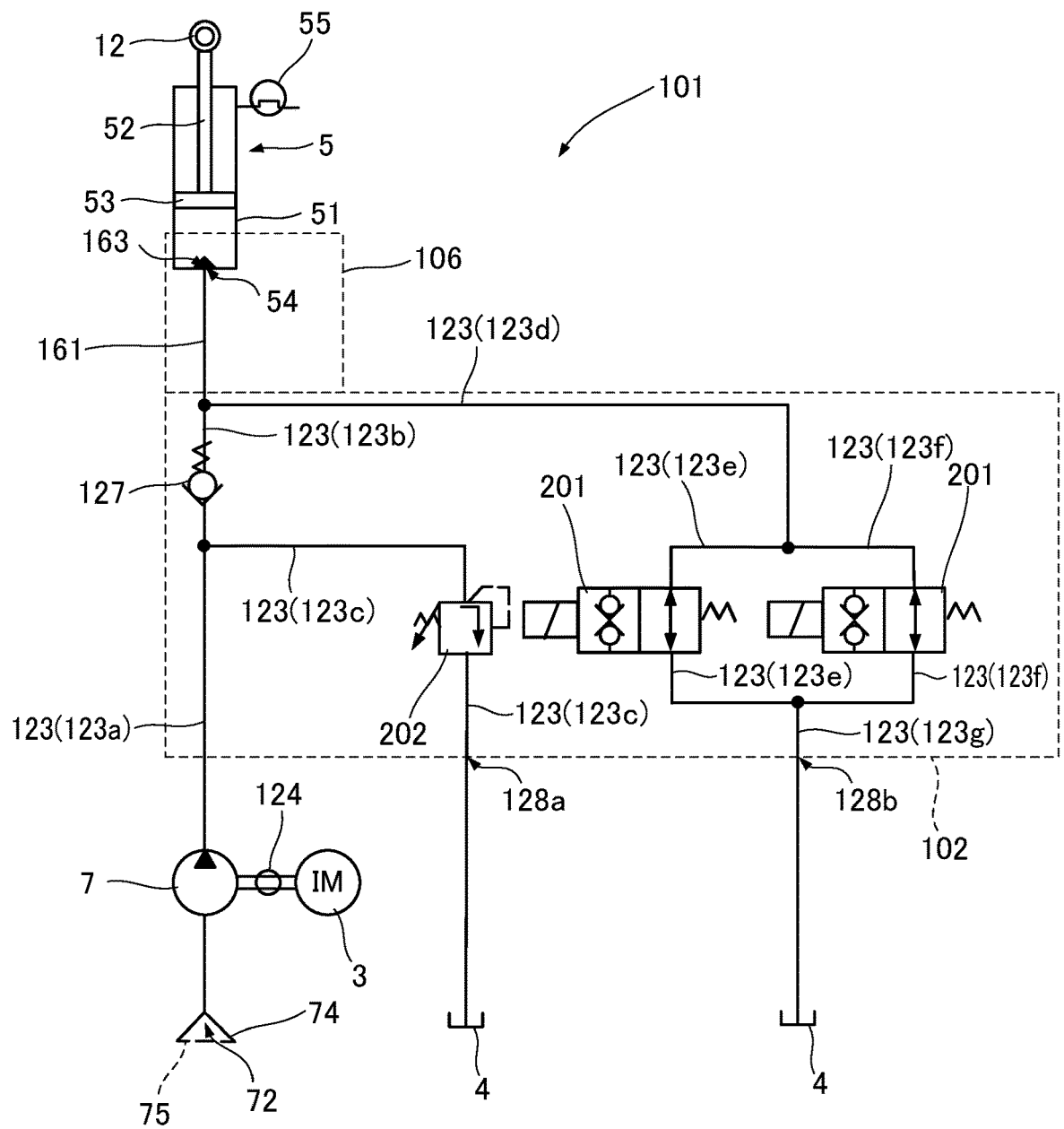
FIG. 10 is a diagram illustrating an oil hydraulic circuit of the electro-hydraulic actuator according to the second embodiment.

FIG. 9 illustrates a schematic structure of a thruster 101 according to the second embodiment. Additionally, FIG. 10 illustrates an oil hydraulic circuit of the thruster 101. FIG. 9 is a cross-sectional view in a case where the thruster 101 is cut at a plane including the rotational axis of the motor shaft 31. Note that, in FIG. 9, a part of the thruster 101 is enlarged to be illustrated.

As illustrated in FIG. 9, as with the thruster 1 according to the first embodiment, the thruster 101 according to the second embodiment includes a coupling block 102 in which flow channels (123, 161) of the working oil are formed and a manifold block 106. Basic exterior shapes of the coupling block 102 and the manifold block 106 included in the thruster 101 according to the second embodiment are similar to that of the thruster 1 according to the first embodiment. In the coupling block 102, a communication hole 121 in which a bearing 122 of the motor shaft 31 is incorporated and through which the space in the lower chassis and the space in the upper chassis communicate with each other is formed. Additionally, in the manifold block 106, a circular recess portion 162 into which a lower end side of the oil hydraulic cylinder 5 is inserted is formed in a top surface, and also a recess portion opening 163 communicating with the flow channel 161 inside is formed in a bottom portion of the recess portion 162. Moreover, on a lower end side of the manifold block 106, a storage space 164a of the external gear pump 7 and an opening portion 165a through which the storage space 164a and the reservoir 4 communicate with each other and the bell mouth 74 of the external gear pump 7 is exposed into the reservoir 4 are formed.

However, while a large part of the flow channels forming the oil hydraulic circuit in the thruster 1 according to the first embodiment is formed in the manifold block 6, many of the flow channels forming the oil hydraulic circuit in the thruster 101 according to the second embodiment are formed in a coupling block 102 side. Additionally, all the valves (127, 201, 202) included in the oil hydraulic circuit are provided on the coupling block 102 side. Moreover, all the valves (127, 201, 202) are disposed outside the reservoir 4. Thus, in the thruster 101 according to the second embodiment, since the solenoid valve 201 that causes a rise in the oil temperature is disposed outside the reservoir 4, the viscosity of the working oil is not reduced in accordance with the activation of the thruster 101, and it is possible to control the flow velocity of the working oil in the flow channel more accurately.

Note that, out of the valves (127, 201, 202) provided on the coupling block 102 side, the valves (127, 202) other than the solenoid valve 201 that causes a rise in the oil temperature are not necessarily disposed in a region outside the reservoir 4 or on the coupling block 102 side.

Figure 11:
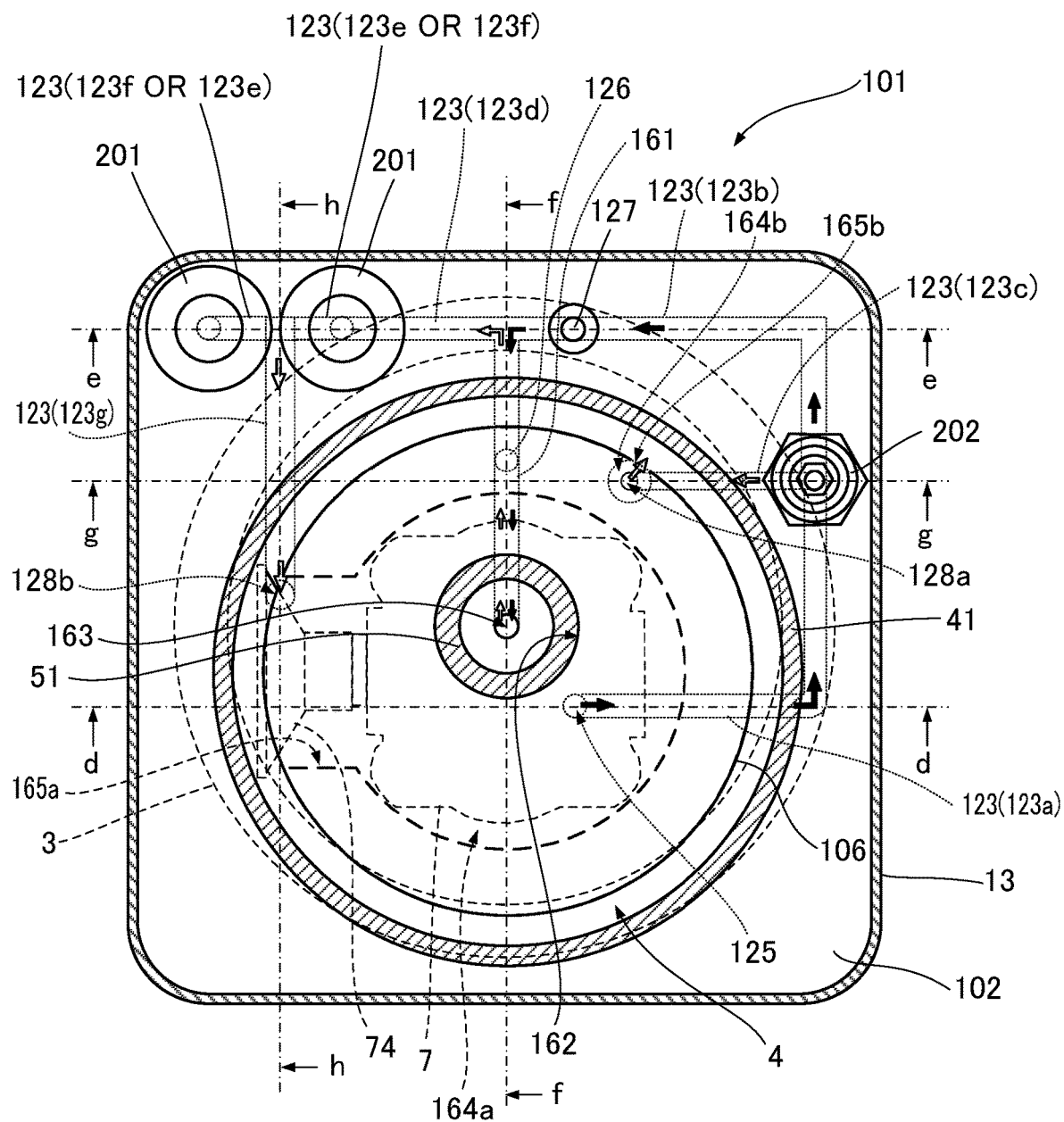
FIG. 11 is a cross-sectional view illustrating a cross section taken along the line c-c in FIG. 9.

Next, a structure and the like of the flow channel in the thruster 101 according to the second embodiment are described. FIG. 11 illustrates a cross section taken along the line c-c in FIG. 9. Additionally, FIGS. 12, 13, 14, 15, and 16 illustrate a cross section taken along the line d-d, a cross section taken along the line e-e, a cross section taken along the line f-f, a cross section taken along the line g-g, and a cross section taken along the line h-h in FIG. 11, respectively.

Note that, in FIGS. 9 and 11 to 16, only outline shapes of the flow channels (123, 168) are illustrated, and a processed hole formed in a metallic block in the process of manufacturing the coupling block 102 and the manifold block 106, a plug closing the hole, and the like are omitted. Additionally, in FIGS. 9 and 11 to 16, a reference sign provided to a configuration other than the configurations related to the coupling block 102 and the manifold block 106 is the same as that provided to the configuration of the thruster 1 according to the first embodiment illustrated in FIGS. 1 to 7. Moreover, in FIGS. 9 and 11 to 16, a member and a portion unnecessary in the descriptions related to the flow channels (123, 161) may not be illustrated. Alternatively, the reference sign is omitted in some cases even for a portion and a member illustrated in the drawings if it is unnecessary in the descriptions related to the flow channels (123, 161). As a matter of course, the flow channels in the oil hydraulic circuit illustrated in FIG. 10 and the flow channels in the coupling block 102 and the manifold block 106 actually created may be different in the state of divergence and convergence. Hereinafter, an operation of the thruster 101 is described with reference to FIGS. 9 and 10 while referring to any one of FIGS. 11 to 16 as needed.

As illustrated in FIGS. 9 to 16, in the thruster 101 according to the second embodiment, many of the flow channels (123, 161) forming the oil hydraulic circuit are formed in the coupling block 2, and all the discharge ports (128a, 128b) for returning the working oil in the flow channels (123, 161) into the reservoir 4 are opened in the top surface of the coupling block 102.

Figure 12:
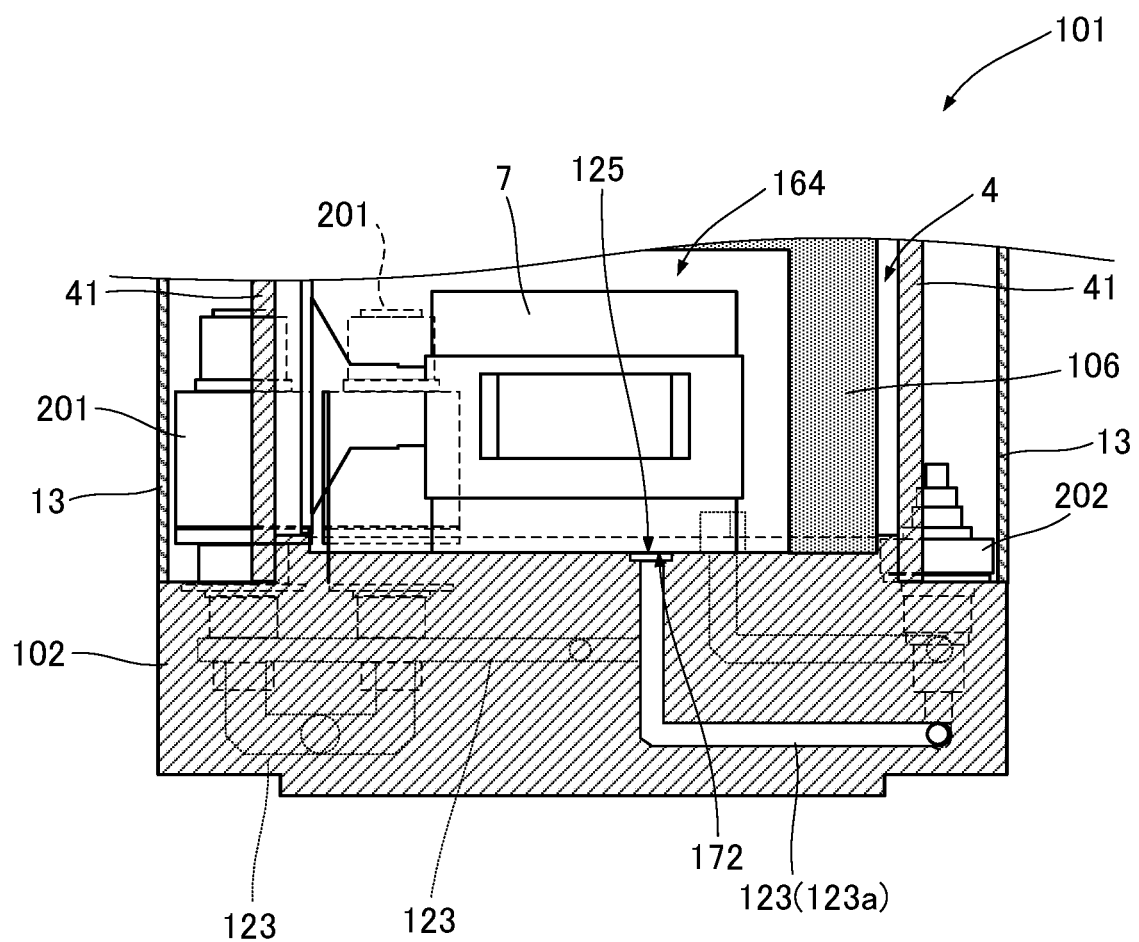
FIG. 12 is a cross-sectional view illustrating a cross section taken along the line d-d in FIG. 11.

As illustrated in FIG. 12, a flow channel 123a in the coupling block 102 in which an inlet 125 is one end extends downward and is thereafter curved at a right angle to extend to the outside of the reservoir 4. Then, as illustrated in FIG. 11, the flow channel 123 in the coupling block 102 viewed from above follows a route to be guided from the inlet 125 to the outside of the reservoir 4 and thereafter extends around an outer periphery side of the coupling block 102 to pass through the relief valve 202 or through the relief valve 202 and the check valve 127 to return to the inside of the reservoir 4 again. Note that, as illustrated in FIG. 13, the flow channel 123a from the relief valve 202 toward the check valve 127 is curved in the shape of a crank facing upward on the way, and the check valve 127 is incorporated in the flow channel in the vertical direction in the curved region.

Figure 13:
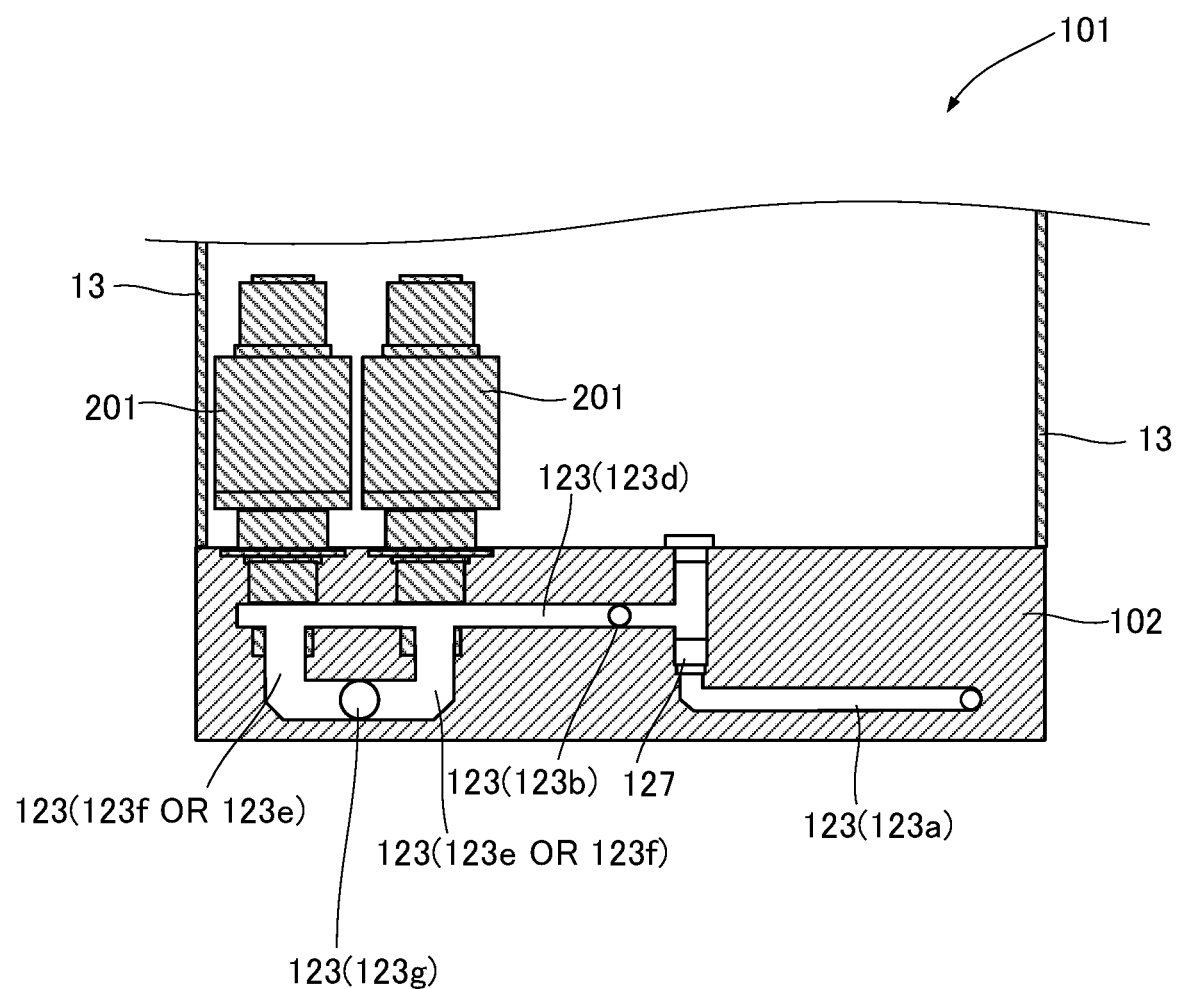
FIG. 13 is a cross-sectional view illustrating a cross section taken along the line e-e in FIG. 11.
Figure 14:
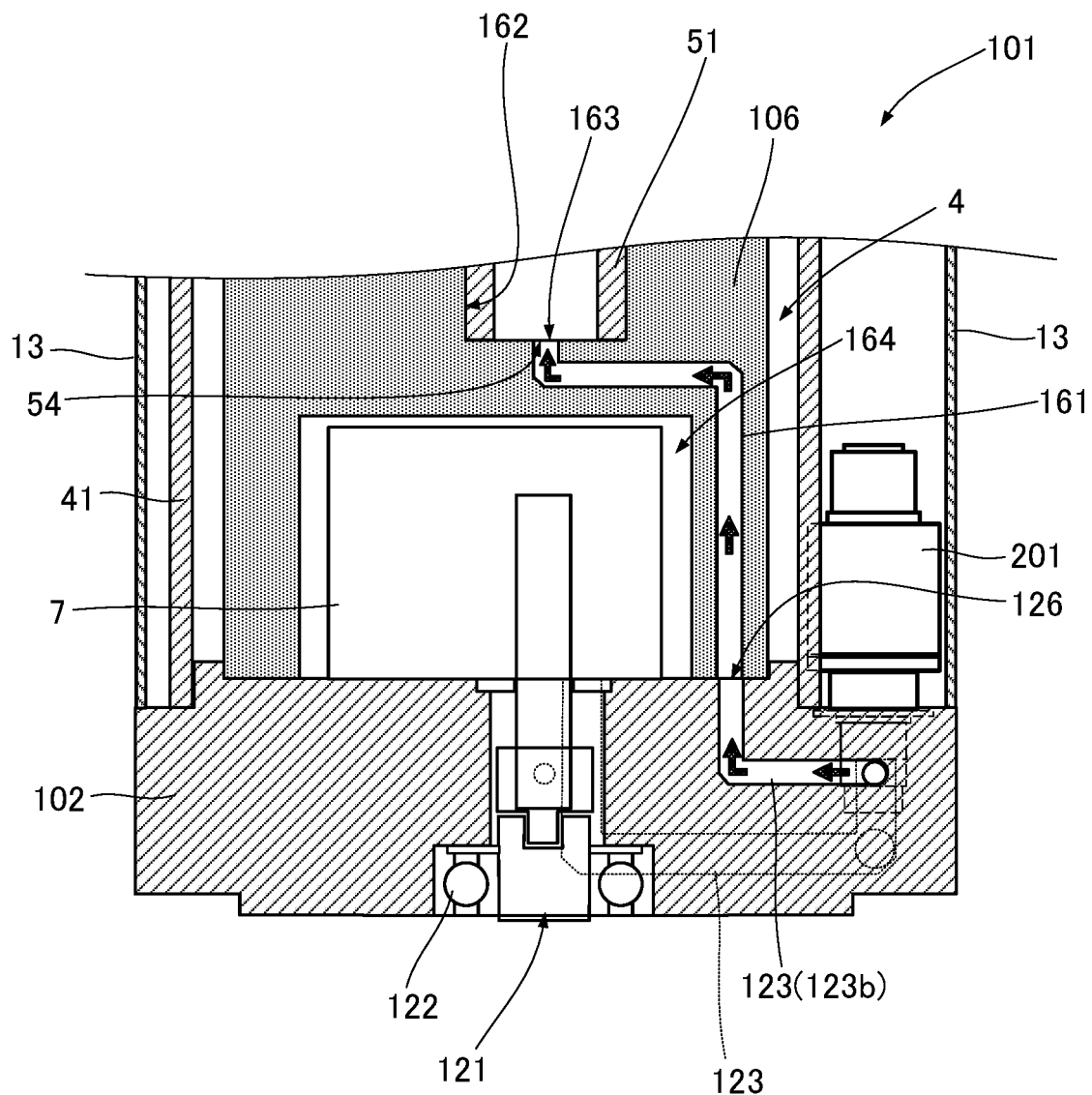
FIG. 14 is a cross-sectional view illustrating a cross section taken along the line f-f in FIG. 11.

As illustrated in FIGS. 11, 13, and 14, the flow channel 123b passing through the check valve 127 is guided to the inside of the reservoir 4 and thereafter opened as an outlet 126 in a region facing a bottom surface of the manifold block 106. Additionally, in the bottom surface of the manifold block 106, one end of the flow channel 161 formed in the manifold block 106 is opened in a position facing the outlet 126 of the coupling block 102. With this, the working oil guided from the flow channel 123 in the coupling block 102 to the flow channel 161 in the manifold block 106 passes through the port 54 of the oil hydraulic cylinder 5 from the recess portion opening 163 of the manifold block 106 to fill the inside of the cylinder tube 51, and thus the piston 53 is pushed up. Accordingly, in the thruster 101 according to the second embodiment, the flow channels (123a, 123b, 161) from the inlet 125 of the coupling block 102 to the recess portion opening 163 in the manifold block 106 are the pressurization flow channel. For reference, the flow of the working oil in the pressurization flow channel is indicated by black-colored arrows in FIGS. 11 and 14.

Figure 15:
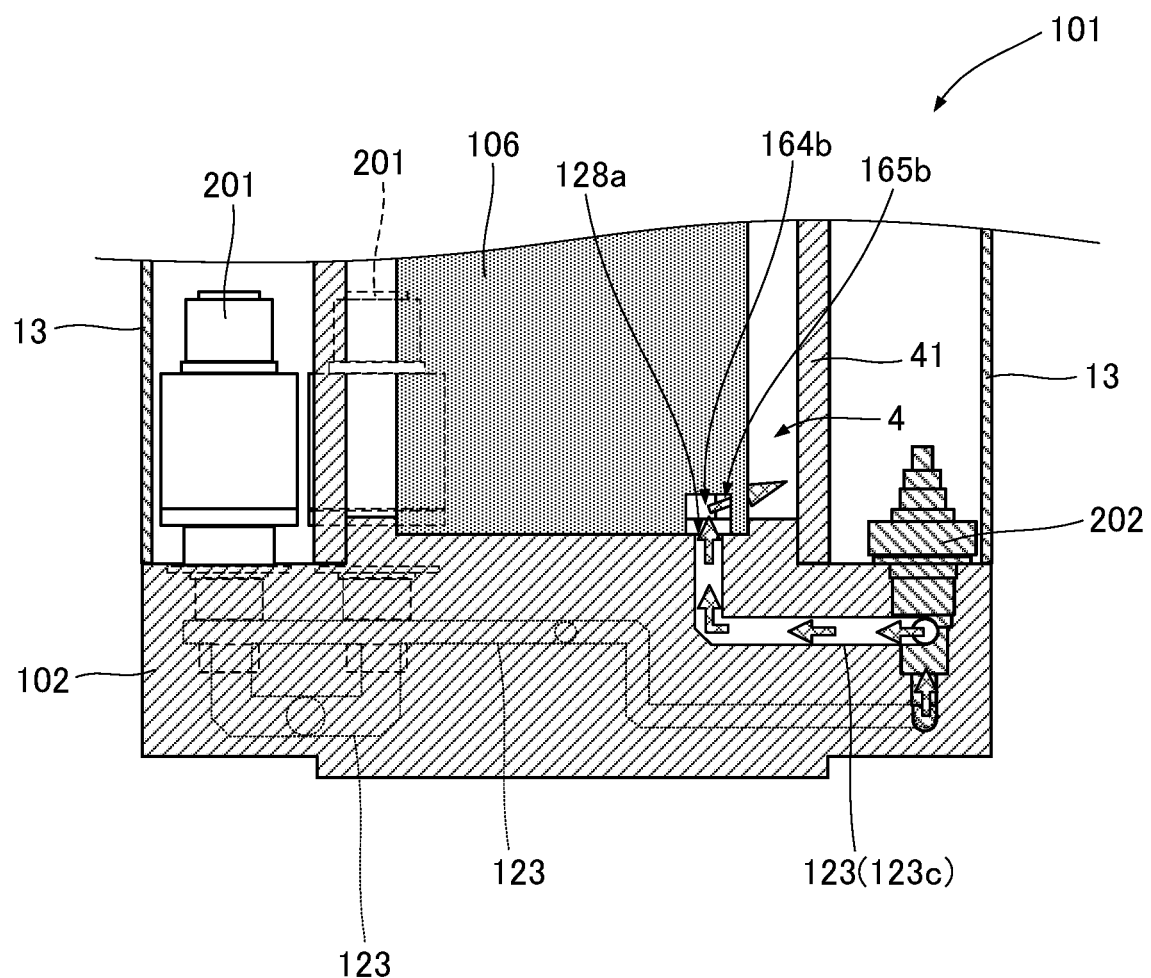
FIG. 15 is a cross-sectional view illustrating a cross section taken along the line g-g in FIG. 11.

Additionally, as illustrated in FIGS. 11 and 15, the flow channel 123a from the inlet 125 toward the check valve 127 is diverged as a pressure adjustment flow channel 123c inside the relief valve 202, and the pressure adjustment flow channel 123c is opened as the discharge port 128a inside the reservoir 4 viewed from above. Moreover, the discharge port 128a is opened in a region in which the manifold block 106 is arranged, and a space 164b in a hollow cylinder form is formed in a region facing the discharge port 128a in the bottom surface of the manifold block 106. Furthermore, in the space 164b, an opening portion 165b communicating with the reservoir 4 is formed. With this, once the oil pressure in the pressurization flow channel exceeds a predetermined pressure, the relief valve 202 is opened, and as indicated by a hatched arrow in FIGS. 11 and 15, a part of the working oil is guided from the pressure adjustment flow channel 123c to the above-described space formed on the bottom surface of the manifold block 106 and returned to the reservoir 4 by way of the above-described opening portion 165b.

Figure 16:
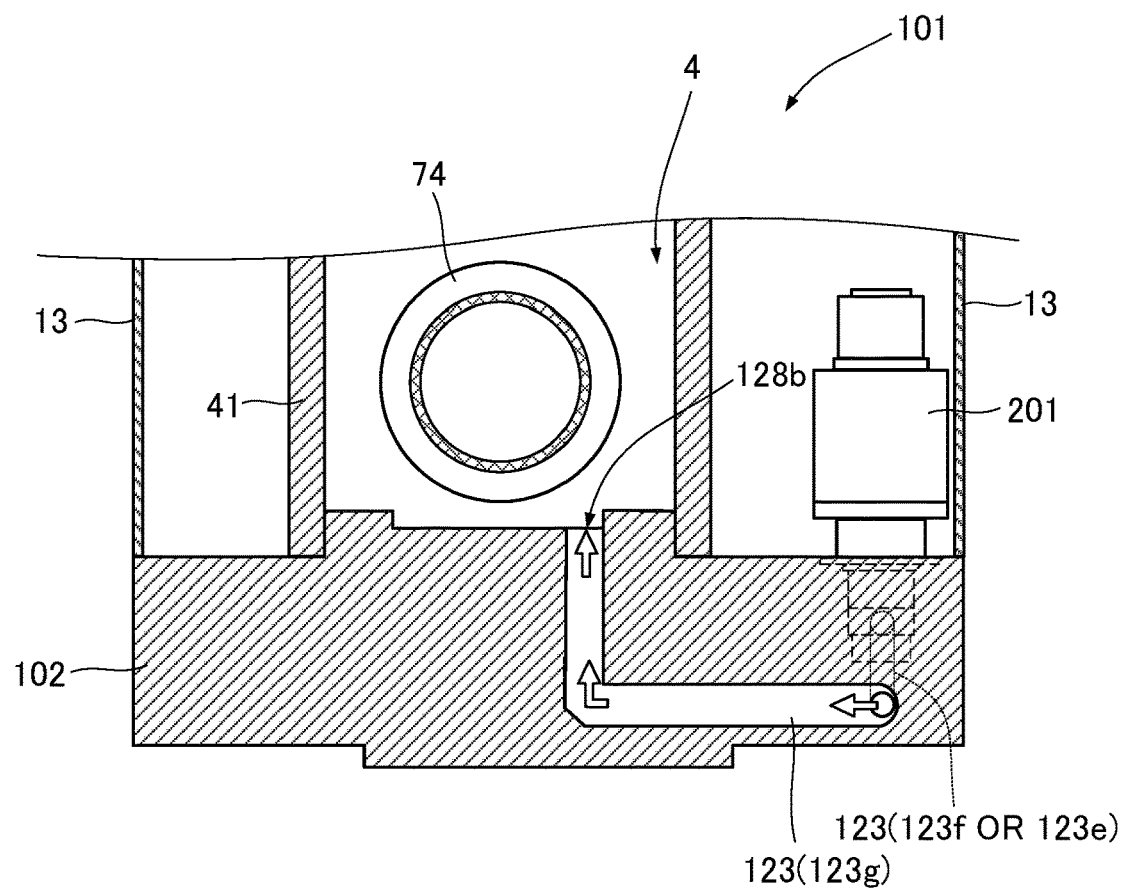
FIG. 16 is a cross-sectional view illustrating a cross section taken along the line h-h in FIG. 11.

Additionally, in the thruster 101 according to the second embodiment, as illustrated in FIGS. 11 and 13, in the coupling block 102, the flow channel 123b coupled to the flow channel 168 in the manifold block 106 from the check valve 127 is diverged, and the two solenoid valves 201 are arranged in a diverged flow channel 123d. As illustrated in FIGS. 11 and 16, the diverged flow channel 123d passes through each of the two solenoid valves 201 disposed outside the reservoir 4 and is thereafter converged into a single flow channel 123g again to be guided to the inside of the reservoir 4. Moreover, the converged flow channel 123g is opened as the discharge port 128b inside the reservoir 4.

With this, once the two solenoid valves 201 are opened while the piston 53 is being pushed up by the oil pressure in the cylinder tube 51, as indicated by a white-colored arrow in FIGS. 11 and 16, the working oil is returned to the reservoir 4 through the depressurization flow channel through which the working oil in the cylinder tube 51 reaches the reservoir 4 by way of the solenoid valves 201 from the recess portion opening 163 of the manifold block 106, and the piston 53 is pushed downward by bias force of the external mechanism coupled to an upper end of the piston rod 52.

Other Embodiments

Embodiments of the present invention is described above; however, the present invention is not limited to the above-described embodiments and is changeable in various ways without departing from the gist. Additionally, the above-described embodiments are detailed descriptions to clearly describe the present invention and are not necessarily limited to an embodiment including all the described configurations. Moreover, addition, deletion, or replacement of another configuration can be made to a part of the configurations of the above-described embodiments.

For example, in the thruster 1 according to the first embodiment, all the flow channels of the working oil may be formed in the manifold block 6. Additionally, in the above-described thrusters (1, 101) according to each embodiment, the oil hydraulic cylinder 5 is arranged such that the piston 53 reciprocates in the vertical direction; however, the oil hydraulic cylinder 5 may be arranged so as to reciprocate in a direction crossing the motor shaft 31 (for example, an orthogonal direction).

The manifold blocks (6, 106) and the cylinder tube 51 may not be arranged in the reservoir 4, and a part of or all the mechanisms and members in the upper chassis may be arranged outside the reservoir 4. For example, the opening portions (67, 165a) in slit forms may not be formed in the storage spaces (66, 164a) of the external gear pump 7, and the external gear pump 7 may be stored liquid-tightly in the manifold block 6 while being attached to the coupling block 2. Additionally, a flow channel that communicates with the storage space 66 from the reservoir 4 arranged in a proper position of the upper chassis is formed in the manifold block 6. With this, only the external gear pump 7 as a main noise source can be immersed in the working oil, and the noise can be inhibited.

The position of the suction port 72 in the external gear pump 7 of the thruster 1 according to the above-described embodiment is opened in a direction orthogonal to the driving shaft 71; however, the suction port 72 may be opened in an arbitrary direction in accordance with a layout of various configurations arranged above the coupling block 2, the reciprocation direction of the piston rod 52, and the like.

The number of the divergence of the depressurization flow channel can be set arbitrarily in accordance with application, required spec, price, and the like of the thruster 1.

The thruster 1 according to the embodiments is configured such that, when the inside of the cylinder tube 51 is depressurized, the piston 53 falls with the downward bias force of the external mechanism coupled to the head 12, and the working oil in the cylinder tube 51 is returned to the reservoir 4 through the depressurization flow channel (68c to 68e) and the solenoid valve 61. Instead of this configuration, for example, a configuration may be applied in which a spring that biases the piston 53 downward is disposed in the cylinder tube 51 or the like such that the piston 53 is pushed downward without depending on the bias force from the external mechanism.

The hydraulic actuator of the thruster 1 according to the embodiments is the oil hydraulic cylinder 5; however, it is also possible to change the hydraulic actuator to a hydraulic actuator of an arbitrary form such as a hydraulic actuator including a mechanism of rotating by the oil pressure. Additionally, the exterior shape of the thruster 1 is not limited to the form of a rectangular tube and can be changed in accordance with the form, the movement direction, the internal structure, and the like of the incorporated hydraulic actuator.

LIST OF REFERENCE SIGNS 1, 101 thruster (electro-hydraulic actuator, electric oil hydraulic cylinder),
2, 102 coupling block,
3 motor,
4 reservoir,
5 oil hydraulic cylinder,
6, 106 manifold block,
7 gear pump (external gear pump),
11 clevis,
12 head,
13 upper cover,
14 insertion hole of piston rod,
15 top lid plate,
16 lower cover,
17 base plate,
18 attachment bolt,
21, 121 communication hole,
22, 122 bearing in coupling block,
23, 123, 123a to 123g flow channel in coupling block,
24 joining member,
25, 125 inlet,
26, 126 outlet,
27, 127 check valve,
31 motor shaft,
41 reservoir case,
51 cylinder tube,
52 piston rod,
53 piston,
54 port of (oil hydraulic cylinder 5),
55 proximity sensor,
61, 201 solenoid valve,
62, 202 relief valve,
64, 163 recess portion opening,
66, 164a storage space of external gear pump,
68, 68a to 68f, 168 flow channel in manifold block,
69a, 69b, 128a, 128b discharge port,
71 driving shaft,
72 suction port,
80 throttle mechanism (orifice),
171 pump case,
171a case main body,
171b cover portion,
172 ejection port,
174 shaft hole,
175a driving gear,
175b driven gear,
176a suction side pressure chamber,
176b ejection side pressure chamber

The invention claimed is:

1. An electro-hydraulic actuator, comprising:
a motor configured to output rotative power;
an external gear pump configured to be activated by the motor;
a hydraulic actuator configured to be operated by a pressurized working fluid supplied by the external gear pump;
a manifold block in which a flow channel forming one portion of a working fluid circuit of the hydraulic actuator is incorporated;
a first portion configured to store the motor;
a second portion configured to store the external gear pump, the hydraulic actuator, and a reservoir; and
a coupling portion separable from the manifold block, configured to couple the first portion and the second portion with each other in a liquid-tight state, wherein
the coupling portion includes a communication hole through which the first portion and the second portion communicate with each other and a flow channel forming another portion of the working fluid circuit is formed,
a rotational shaft of the motor and a driving shaft of the external gear pump are joined to each other in the communication hole,
a solenoid valve configured to open and close the flow channel formed in the coupling portion, wherein the solenoid valve is arranged outside the reservoir, and
the external gear pump is attached to the coupling portion while being stored in manifold block, the manifold block being immersed in the working fluid.

2. The electro-hydraulic actuator according to claim 1, wherein
in the coupling portion, a bearing of the rotational shaft of the motor is arranged in the communication hole, and
in the flow channel formed in the coupling portion, one end is coupled to an ejection port of the working fluid in the external gear pump, and another end is coupled to an inlet of the working fluid in the manifold block.

3. The electro-hydraulic actuator according to claim 1, wherein
the reservoir is a sealed space occupying an inner region of the second portion, and
a housing of the manifold block, the external gear pump, and the hydraulic actuator is stored in the reservoir.

4. The electro-hydraulic actuator according to claim 1, wherein
the flow channel includes a pressurization flow channel configured to guide the working fluid into the hydraulic actuator and a depressurization flow channel configured to guide the working fluid in the hydraulic actuator to the reservoir,
the depressurization flow channel is diverged into a plurality of flow channels while a valve mechanism is arranged in each of the diverged flow channels, and
the valve mechanism in an open state returns the working fluid to the reservoir.

5. The electro-hydraulic actuator according to claim 1, wherein
the flow channel includes a pressurization flow channel configured to guide the working fluid into the hydraulic actuator and a depressurization flow channel configured to guide the working fluid in the hydraulic actuator to the reservoir,
a valve mechanism and a throttle mechanism are arranged in the middle of the depressurization flow channel,
the valve mechanism in an open state returns the working fluid to the reservoir, and
the throttle mechanism reduces a flow velocity of the working fluid from the hydraulic actuator toward the reservoir.

6. The electro-hydraulic actuator according to claim 5, wherein
the throttle mechanism includes an orifice.

7. The electro-hydraulic actuator according to claim 5, wherein
the depressurization flow channel is diverged into a plurality of flow channels while the valve mechanism is arranged in each of the diverged flow channels.

8. The electro-hydraulic according to claim 1, wherein the hydraulic actuator is an oil hydraulic cylinder, and a tip of a piston rod of the oil hydraulic cylinder projects from a chassis of the second portion.

* * * * *